US012561851B2

(12) United States Patent　　　　(10) Patent No.:　US 12,561,851 B2
Hinz et al.　　　　　　　　　　　　(45) Date of Patent:　Feb. 24, 2026

(54) HIGH-RESOLUTION IMAGE GENERATION USING DIFFUSION MODELS

(71) Applicant: ADOBE INC., San Jose, CA (US)

(72) Inventors: Tobias Hinz, Campbell, CA (US); Siddharth Iyer, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 195 days.

(21) Appl. No.: 18/481,308

(22) Filed: Oct. 5, 2023

(65) Prior Publication Data

US 2025/0117968 A1　　Apr. 10, 2025

(51) Int. Cl.
*G06T 11/00*　　　(2006.01)
*G06N 3/0455*　　　(2023.01)
*G06T 3/4046*　　　(2024.01)
*G06T 3/4053*　　　(2024.01)

(52) U.S. Cl.
CPC ............ *G06T 11/00* (2013.01); *G06T 3/4053* (2013.01)

(58) Field of Classification Search
CPC ..... G06T 11/00; G06T 3/4053; G06T 3/4046; G06T 3/4076; G06T 5/60; G06T 5/70; G06T 2200/24; G06T 2207/20081; G06T 2207/20084; G06T 2210/36; G06T 2211/441; G06N 3/0455
See application file for complete search history.

(56) References Cited

U.S. PATENT DOCUMENTS

| | | | |
|---|---|---|---|
| 11,908,180 B1 * | 2/2024 | Ho | ......................... G06T 3/4053 |
| 2023/0377226 A1 * | 11/2023 | Saharia | ................. G06V 10/82 |
| 2024/0320789 A1 | 9/2024 | Hinz et al. | |

FOREIGN PATENT DOCUMENTS

| | | | |
|---|---|---|---|
| CN | 116681584 A | * | 9/2023 |
| CN | 117575907 A | | 2/2024 |

OTHER PUBLICATIONS

Jain, Arti et al. An Effective Image Denoising Approach Based on Denoising with Image Interpolation [Online]. Oct. 2, 2023 [Retrieved on Jun. 9, 2025]. Retrieved from the Internet: <URL: https:// ieeexplore.ieee.org/document/10263909?source=IQplus > (Year: 2023).*
Song, Yang et al. Score-Based Generative Modeling through Stochastic Differential Equations [Online]. Feb. 10, 2021 [Retrieved on Jun. 9, 2025]. Retrieved from the Internet: <URL: https://arxiv.org/ pdf/2011.13456 > (Year: 2021).*

(Continued)

*Primary Examiner* — King Y Poon
*Assistant Examiner* — Michelle Hau Ma
(74) *Attorney, Agent, or Firm* — F. CHAU & ASSOCIATES, LLC

(57)　　　ABSTRACT
Methods, non-transitory computer readable media, apparatuses, and systems for high-resolution image generation using diffusion models include obtaining a prompt and generating, using a first diffusion model, a predicted denoised image at a first resolution based on the prompt. The predicted denoised image is generated at a first intermediate diffusion step of the first diffusion model. The predicted denoised image is upsampled to obtain an upsampled denoised image at a second resolution that is higher than the first resolution. A second diffusion model then generates an output image at the second resolution based on the prompt and the upsampled denoised image.

20 Claims, 13 Drawing Sheets

(56) References Cited

OTHER PUBLICATIONS

Ackermann et al. High-Resolution Image Editing via Multi-Stage Blended Diffusion [Online]. Oct. 24, 2022 [Retrieved on Nov. 4, 2025]. Retrieved from the Internet: <URL: https://arxiv.org/abs/2210.12965 > (Year: 2022).*

Aleksusklim. 'Allow saving intermediate Steps to separate image files during generation' In GitHub [Online]. Sep. 25, 2022 [Retrieved on Nov. 4, 2025]. Retrieved from the Internet: <URL: https://github.com/AUTOMATIC1111/stable-diffusion-webui/issues/1026 > (Year: 2022).*

1Ho, et al., "Cascaded Diffusion Models for High Fidelity Image Generation", arXiv preprint arXiv:2106.15282v3 [cs.CV] Dec. 17, 2021, 33 pages.

2Jing, et al., "Subspace Diffusion Generative Models", arXiv preprint arXiv:2205.01490v2 [cs.LG] Feb. 27, 2023, 20 pages.

3Ryu, et al., "Pyramidal Denoising Diffusion Probabilistic Models", arXiv preprint arXiv:2208.01864v3 [cs.CV] Sep. 30, 2022, 19 pages.

4Gu, et al., "f-DM: A Multi-Stage Diffusion Model via Progressive Signal Transformation", arXiv preprint arXiv:2210.04955v1 [cs.CV] Oct. 10, 2022, 28 pages.

5Zhang, et al., "Dimensionality-Varying Diffusion Process", arXiv preprint arXiv:2211.16032v1 [cs.LG] Nov. 29, 2022, 16 pages.

Combined Search and Examination Report dated Oct. 23, 2024 in corresponding United Kingdom Patent Application No. 2407740.6., 4 pages.

* cited by examiner

Output image

"A happy dog outside"

Figure 2:
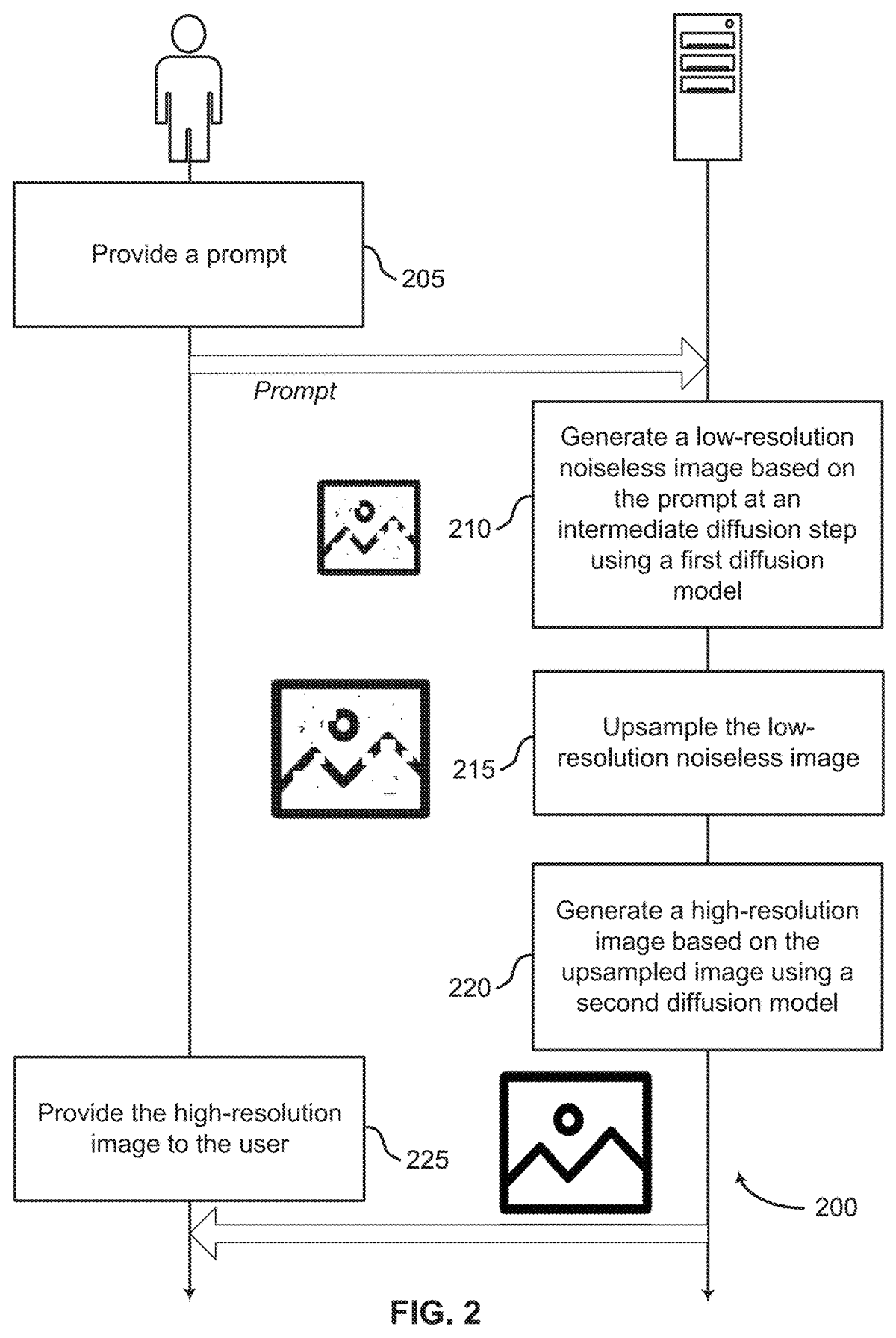

Provide a prompt — 205

Prompt

Generate a low-resolution noiseless image based on the prompt at an intermediate diffusion step using a first diffusion model

210

Upsample the low-resolution noiseless image

215

Generate a high-resolution image based on the upsampled image using a second diffusion model

220

Provide the high-resolution image to the user — 225

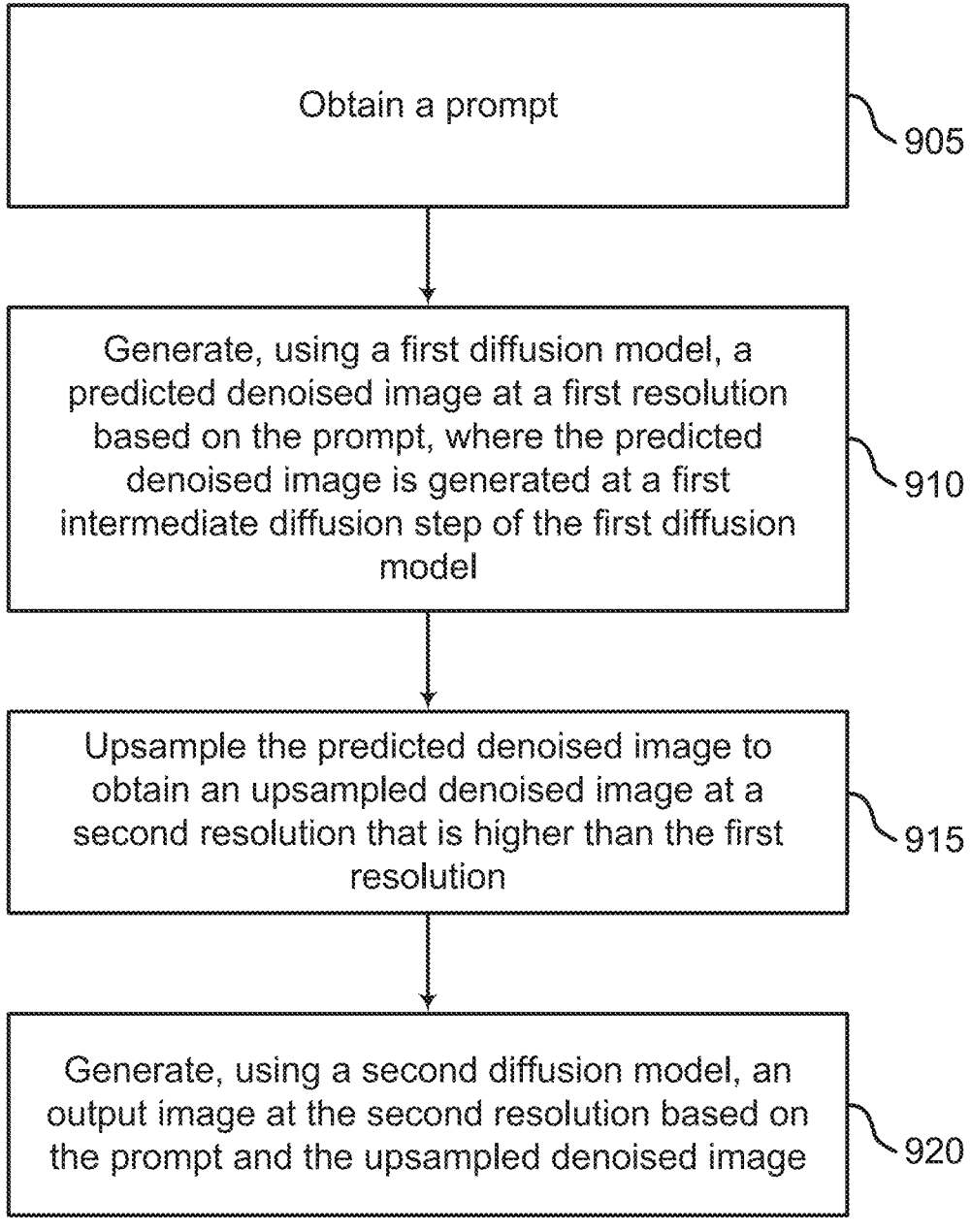

Obtain a prompt ⟍905

Generate, using a first diffusion model, a predicted denoised image at a first resolution based on the prompt, where the predicted denoised image is generated at a first intermediate diffusion step of the first diffusion model ⟍910

Upsample the predicted denoised image to obtain an upsampled denoised image at a second resolution that is higher than the first resolution ⟍915

Generate, using a second diffusion model, an output image at the second resolution based on the prompt and the upsampled denoised image ⟍920

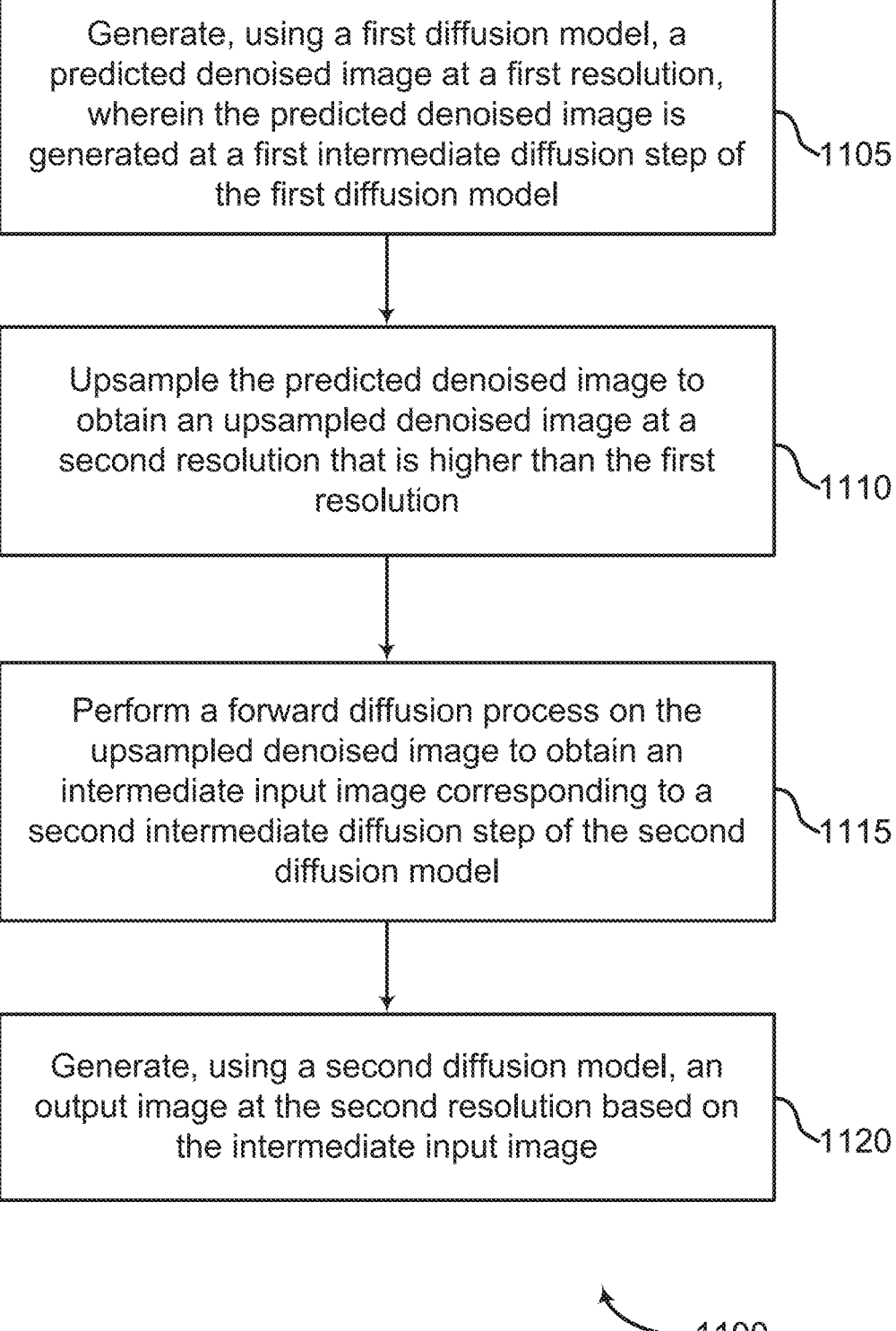

Generate, using a first diffusion model, a predicted denoised image at a first resolution, wherein the predicted denoised image is generated at a first intermediate diffusion step of the first diffusion model ~1105

Upsample the predicted denoised image to obtain an upsampled denoised image at a second resolution that is higher than the first resolution ~1110

Perform a forward diffusion process on the upsampled denoised image to obtain an intermediate input image corresponding to a second intermediate diffusion step of the second diffusion model ~1115

Generate, using a second diffusion model, an output image at the second resolution based on the intermediate input image ~1120

Figure 13:
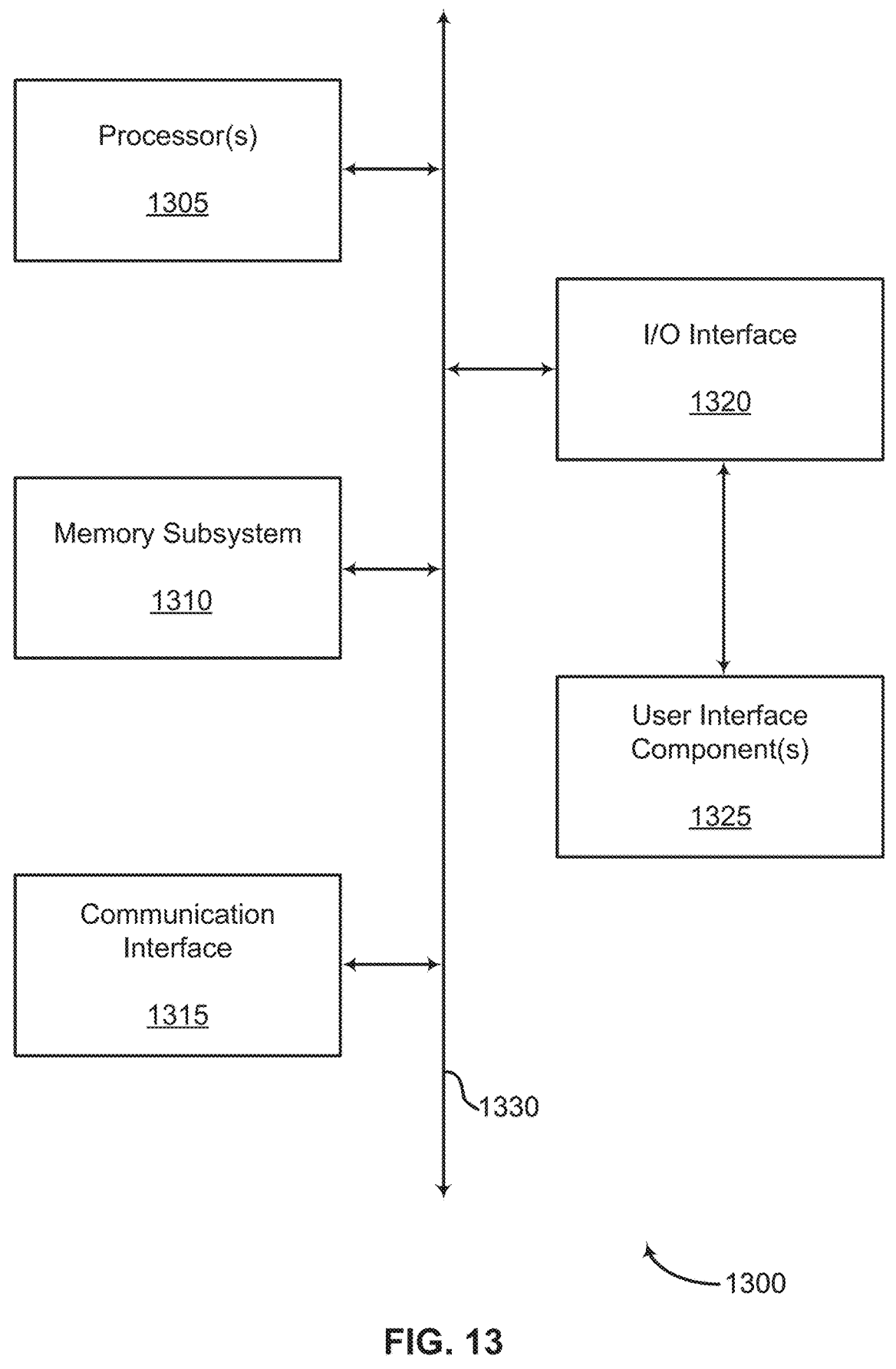

Processor(s)

1305

I/O Interface

1320

Memory Subsystem

1310

User Interface
Component(s)

1325

Communication
Interface

HIGH-RESOLUTION IMAGE GENERATION USING DIFFUSION MODELS

BACKGROUND

The following relates generally to machine learning, and more specifically to high-resolution image generation using diffusion models. Machine learning is an information processing field in which algorithms or models such as artificial neural networks are trained to make predictive outputs in response to input data without being specifically programmed to do so. For example, a machine learning model can be trained to predict an output image using image training data.

A diffusion model is a machine learning model that is well-suited for image generation. In some cases, a diffusion model works by gradually removing a Gaussian distribution of noise from a noisy image in a series of diffusion steps according to the diffusion model's predictions of what a denoised image should look like. As the series of diffusion steps progresses, the diffusion model's prediction of the denoised image becomes increasingly accurate.

SUMMARY

Aspects of the present disclosure provide methods, non-transitory computer readable media, apparatuses, and systems for high-resolution image generation using diffusion models. According to an aspect of the present disclosure, a first diffusion model generates a noiseless prediction at a low resolution during an intermediate step of a reverse diffusion process. In some cases, the noiseless prediction is upsampled to a higher resolution and a second diffusion model generates an output image at the higher resolution based on the upsampled noiseless prediction.

By first generating the noiseless prediction at the low resolution and then generating the higher-resolution output based on the noiseless prediction, aspects of the present disclosure provide a reduced total processing time as compared to a conventional method of using one diffusion model to generate an output image at the higher resolution, which at a similar number of diffusion steps would take a relatively longer amount of time to process and at a significantly fewer number of diffusion steps would produce a poor-quality output image.

Furthermore, some conventional image generation systems first generate a low-resolution output image using a diffusion model and then use various upsampling techniques to achieve a higher-resolution output image. By contrast, natively generating the output image at the higher resolution using the second diffusion model based on the upsampled noiseless prediction provides the output image at a better and more accurate quality.

Furthermore, some conventional image generation systems generate a noisy predicted image at an intermediate diffusion step using a first comparative diffusion model, upsample the noisy predicted image, add noise to the upsampled noisy image to correct a distribution of the noise within the upsampled noisy image, and then generate a high-resolution image based on the corrected, upsampled noisy image using a second comparative diffusion model.

By contrast, in some cases, by upsampling the noiseless prediction of the first diffusion model made at an intermediate diffusion step, aspects of the present disclosure avoid having to correct a distribution of noise within the upsampled noiseless prediction, because there is no noise to correct. Because the second diffusion model generates the output image based on the un-corrected upsampled noiseless prediction, the output image is of a higher quality than an output image generated based on a corrected noisy image, which includes imperfections introduced by the noise correction process.

A method, apparatus, non-transitory computer readable medium, and system for image generation are described. One or more aspects of the method, apparatus, non-transitory computer readable medium, and system include obtaining a prompt; generating, using a first diffusion model, a predicted denoised image at a first resolution based on the prompt, wherein the predicted denoised image is generated at a first intermediate diffusion step of the first diffusion model; upsampling the predicted denoised image to obtain an upsampled denoised image at a second resolution that is higher than the first resolution; and generating, using a second diffusion model, an output image at the second resolution based on the prompt and the upsampled denoised image.

A method, apparatus, non-transitory computer readable medium, and system for image generation are described. One or more aspects of the method, apparatus, non-transitory computer readable medium, and system include generating, using a first diffusion model, a predicted denoised image at a first resolution, wherein the predicted denoised image is generated at a first intermediate diffusion step of the first diffusion model; upsampling the predicted denoised image to obtain an upsampled denoised image at a second resolution that is higher than the first resolution; performing a forward diffusion process on the upsampled denoised image to obtain an intermediate input image corresponding to a second intermediate diffusion step of a second diffusion model; and generating, using the second diffusion model, an output image at the second resolution based on the intermediate input image.

An apparatus, system, and method for image generation are described. One or more aspects of the apparatus, system, and method include one or more processors; one or more memory components coupled with the one or more processors; a first diffusion model comprising first parameters stored in the one or more memory components, the first diffusion model trained to generate a predicted denoised image at a first resolution, wherein the predicted denoised image is generated at a first intermediate diffusion step of the first diffusion model; an upsampling component configured to upsample the predicted denoised image to obtain an upsampled denoised image at a second resolution that is higher than the first resolution; and a second diffusion model comprising second parameters stored in the one or more memory components, the second diffusion model trained to generate an output image at the second resolution based on the upsampled denoised image.

BRIEF DESCRIPTION OF THE DRAWINGS

FIG. 2 shows an example of a method for high-resolution image generation according to aspects of the present disclosure.

FIG. 9 shows an example of a method for generating a high-resolution image according to aspects of the present disclosure.

FIG. 11 shows an example of a method for generating a high-resolution image using an intermediate input image according to aspects of the present disclosure.

FIG. 13 shows an example of a computing device according to aspects of the present disclosure.

DETAILED DESCRIPTION

Figure 1:
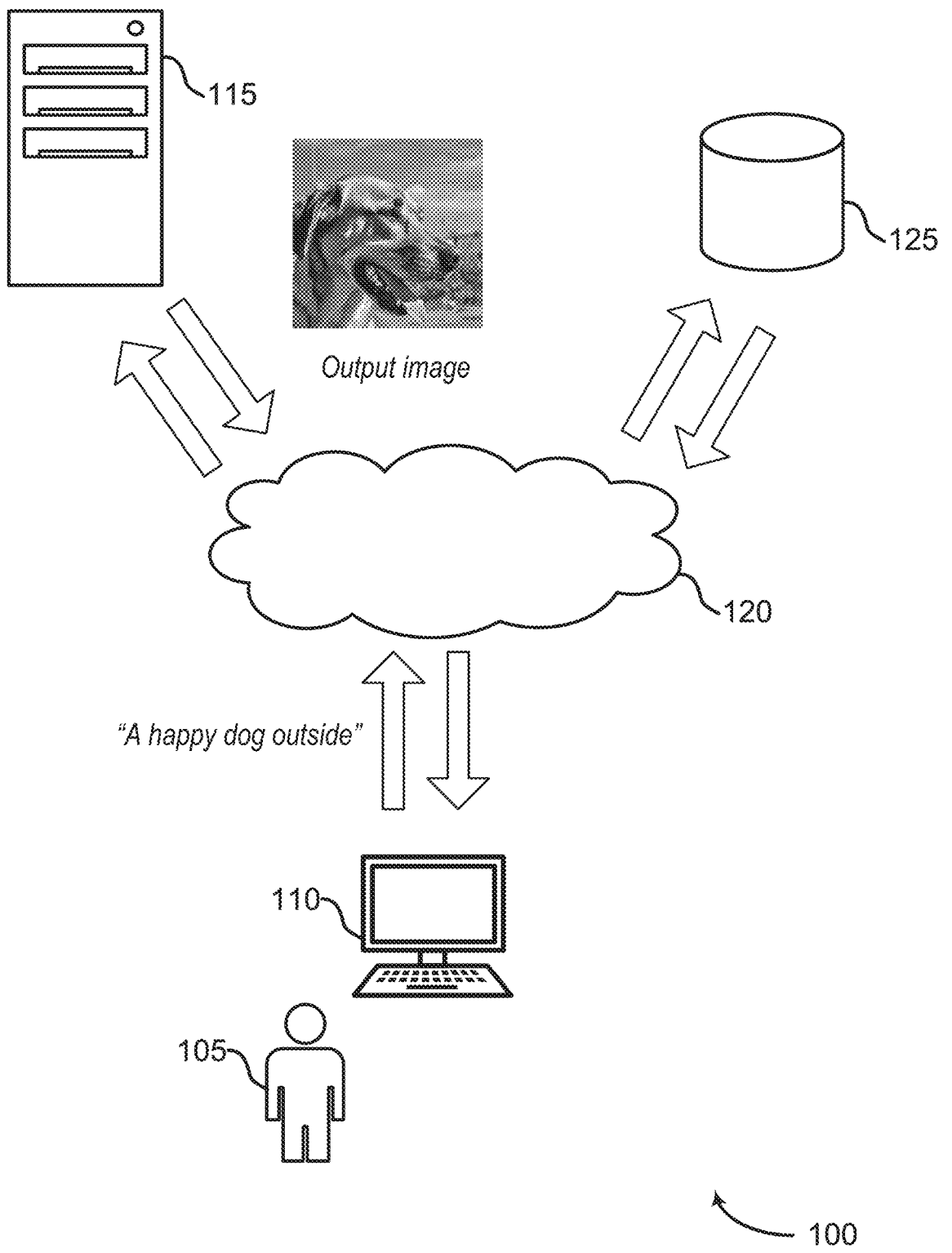
FIG. 1 shows an example of an image generation system according to aspects of the present disclosure.

A diffusion model is a machine learning model that is well-suited for image generation. In some cases, a diffusion model works by gradually removing a Gaussian distribution of noise from a noisy image in a series of diffusion steps according to the diffusion model's prediction of what a denoised image should look like. As the series of diffusion steps progresses, the diffusion model's prediction of the denoised image becomes increasingly accurate.

Diffusion models are capable of producing higher-quality images than other machine learning models. However, diffusion models are trained to generate an image at a particular resolution, and a diffusion model's processing time and memory costs increase as a resolution of the generated image increases because more information must be processed. Therefore, using a diffusion model to generate an image may be impractically slow and costly at higher resolutions, and a diffusion model size may be limited accordingly to fit into the memory of available hardware and to generate the image in a specified timeframe.

A conventional approach to achieving a high-resolution image using a diffusion model includes generating a low-resolution image using the diffusion model and then upsampling the low-resolution image to a higher resolution. However, this approach produces a less accurate result than natively generating the image at the higher resolution using the diffusion model.

Another conventional approach includes using a first comparative diffusion model to generate a low-resolution noisy intermediate image at an intermediate diffusion step, resizing the noisy intermediate image to a higher resolution, and generating an output image at the higher resolution based on the upsampled noisy intermediate image using a second comparative diffusion model. This approach reduces a total processing time due to the initial generation at the low resolution.

However, simply resizing the noisy intermediate image from the low resolution to the higher resolution causes the noise in the image to be non-isotropic (e.g., non-Gaussian) and the upsampled noisy image to have an incorrect signal-to-noise ratio, which means that the second comparative diffusion model is unable to make accurate noise removal predictions based on the raw upsampled noisy intermediate image.

The conventional approach therefore also includes a step of adding specific noise to the upsampled noisy intermediate image so that the noise is again isotropic and Gaussian. However, adding noise to the upsampled noisy intermediate image introduces error into the reverse diffusion process used by the second comparative diffusion model, reducing an accuracy of the higher-resolution output image. Furthermore, this conventional approach is performed in a pixel space using assumptions that may not hold for a latent space.

Aspects of the present disclosure provide methods, non-transitory computer readable media, apparatuses, and systems for high-resolution image generation using diffusion models. According to an aspect of the present disclosure, a first diffusion model generates a noiseless prediction at a low resolution during an intermediate step of a reverse diffusion process. In some cases, the noiseless prediction is upsampled to a higher resolution and a second diffusion model generates an output image at the higher resolution based on the upsampled noiseless prediction.

By first generating the noiseless prediction at the low resolution and then generating the higher-resolution output image based on the noiseless prediction, aspects of the present disclosure provide a reduced total processing time and memory cost as compared to a conventional method of using one diffusion model to generate an output image of comparable quality at the higher resolution. Therefore, aspects of the present disclosure may use larger diffusion models than conventional image generation systems are able to.

Furthermore, according to some aspects, the output image generated based on the noiseless prediction includes a more accurate depiction of the intended content of the output image than a comparative output image generated by upsampling a low-resolution image to a high resolution.

In some cases, during each diffusion step of a reverse diffusion process, a diffusion model predicts a partially denoised image based on a noisy input image, where the partially denoised image can be considered to be a combination of the diffusion step's prediction of a fully denoised image (e.g., an output image) and noise for that diffusion step. In other words, in some cases, at each diffusion step, a prediction of a denoised output image is made, and the prediction of the denoised output image becomes increasingly accurate as the reverse diffusion process progresses. Therefore, in some cases, the noiseless prediction generated at the intermediate diffusion step can be considered as an "incomplete" prediction of an output image, an output image generated at a final step of the reverse diffusion process can be considered to be a "complete" prediction of the output image, and therefore the second diffusion model can be considered to "complete" the noiseless prediction by generating the output image based on the noiseless prediction.

According to some aspects, because the noiseless prediction does not include noise, no noise correction step is needed following the upsampling of the noiseless prediction, in contrast to the conventional approach described above. Therefore, because the noise correction step is avoided, so are errors introduced by the noise correction step, and the output image is consequently more accurate than the comparative output image. Additionally, according to some aspects, both the first diffusion model and the second diffusion model are used in either pixel space or in latent space.

An aspect of the present disclosure is used in an image generation context. In an example, a user instructs the image generation system to generate an image of a dog at a resolution of 128×128 pixels using a prompt "A happy dog outside".

The image generation system generates, based on the prompt and at a resolution of 64×64 pixels, a prediction of a partially denoised image $x_t$ at an intermediate diffusion step t of a reverse diffusion process, where the partially denoised image includes both a noiseless prediction of the output image $x_0$ and a prediction of noise at the intermediate diffusion step t. The image generation system then upsamples the noiseless prediction $x_0$ to the 128×128 resolution and adds noise using a forward diffusion process to get back to $x_t$ as an intermediate input image at the 128×128 resolution. The image generation system then "completes" the noiseless prediction by generating the output image based on the intermediate input image and the prompt at a final step of a second reverse diffusion process.

Because the processing speed of the first diffusion model at 64×64 pixels is roughly four times faster than the processing speed of the second diffusion model at 128×128 pixels, generating both the noiseless prediction and the output image at an equal amount of diffusion steps roughly halves a total processing time as compared to generating the output image exclusively at the 128×128 pixel resolution.

Further example applications of the present disclosure in the image generation context are provided with reference to FIGS. 1-4. Details regarding the architecture of the image generation system are provided with reference to FIGS. 1, 5-8, and 13. Examples of a process for image generation are provided with reference to FIGS. 2 and 9-11. Examples of a process for training an image generation model are provided with reference to FIG. 12.

According to some aspects of the present disclosure, methods, non-transitory computer readable media, systems, and apparatuses for high-resolution image generation using machine learning models are provided that generate a high-resolution output image more quickly and with less memory cost than by using a conventional diffusion model to generate an image of comparable quality at the same resolution, and produce a more accurate output than either upsampling a low resolution output image to the high resolution or upsampling an intermediate noisy output of a first comparative diffusion model that is then completed by a second comparative diffusion model at the high resolution.

Image Generation System

A system and an apparatus for image generation are described with reference to FIGS. 1-8 and 13. One or more aspects of the system and the apparatus include one or more processors; one or more memory components coupled with the one or more processors; a first diffusion model comprising first parameters stored in the one or more memory components, the first diffusion model trained to generate a predicted denoised image at a first resolution, wherein the predicted denoised image is generated at a first intermediate diffusion step of the first diffusion model; an upsampling component configured to upsample the predicted denoised image to obtain an upsampled denoised image at a second resolution that is higher than the first resolution; and a second diffusion model comprising second parameters stored in the one or more memory components, the second diffusion model trained to generate an output image at the second resolution based on the upsampled denoised image.

Some examples of the system and the apparatus further include a forward diffusion component configured to perform a forward diffusion process on the upsampled denoised image to obtain an intermediate input image corresponding to a second intermediate diffusion step of the second diffusion model, wherein the output image is generated based on the intermediate input image. In some aspects, the second diffusion model is further trained to perform a reverse diffusion process beginning with a second intermediate diffusion step.

Some examples of the system and the apparatus further include a training component configured to train the first diffusion model and the second diffusion model. In some aspects, the training component is further configured to train the second diffusion model independently of the first diffusion model.

FIG. 1 shows an example of an image generation system 100 according to aspects of the present disclosure. Image generation system 100 is an example of, or includes aspects of, the corresponding element described with reference to FIG. 8. The example shown includes user 105, user device 110, image generation apparatus 115, cloud 120, and database 125. Image generation apparatus 115 is an example of, or includes aspects of, the corresponding element described with reference to FIG. 5.

Referring to FIG. 1, according to some aspects, user 105 provides a prompt (e.g., "A happy dog outside") to image generation apparatus 115 via user device 110. In some cases, image generation apparatus 115 encodes the prompt to obtain a prompt embedding. In some cases, image generation apparatus 115 generates, using a first diffusion model and based on the prompt embedding, a predicted denoised image at a first resolution. In some cases, the predicted denoised image is generated at a first intermediate diffusion step of the first diffusion model.

In some cases, image generation apparatus 115 upsamples the predicted denoised image to obtain an upsampled denoised image at a second resolution that is higher than the first resolution. In some cases, image generation apparatus 115 uses a forward diffusion component to perform a forward diffusion process on the upsampled denoised image to obtain an intermediate input image corresponding to a second intermediate diffusion step of the second diffusion model, where the upsampled denoised image includes noise added by the forward diffusion process.

In some cases, image generation apparatus 115 generates, using a second diffusion model and based on the prompt embedding, an output image at the second resolution based on the intermediate input image. In some cases, the output image depicts content specified by the prompt. In some cases, image generation apparatus 115 provides the output image to user 105 via user device 110.

As used herein, a "prompt" refers to information that is used to inform an intended output of a machine learning model, such that the output depicts content described by the prompt. In some cases, a prompt includes text, an image, or information in another modality (such as audio) that is capable of describing content of the output.

As used herein, an "embedding" refers to a mathematical representation of an input in a lower-dimensional space such that information about the input is more easily captured and analyzed by the machine learning model. For example, in some cases, an embedding is a numerical representation of the input in a continuous vector space in which objects that have similar semantic information correspond to vectors that are numerically similar to and thus "closer" to each other, allowing machine learning model to effectively compare different objects corresponding to different embeddings with each other.

As used herein, a "predicted denoised image" refers to a diffusion model's prediction of a final output $x_0$. As used herein, an "intermediate diffusion step" refers to a diffusion step that is greater than 0 but is less than a maximum number of steps used for a diffusion model performing the intermediate diffusion step, or a diffusion step that is less than a starting point for a reverse diffusion process that is also an end point for a forward diffusion process.

According to some aspects, user device 110 is a personal computer, laptop computer, mainframe computer, palmtop computer, personal assistant, mobile device, or any other suitable processing apparatus. In some examples, user device 110 includes software that displays a user interface (e.g., a graphical user interface) provided by image generation apparatus 115. In some aspects, the user interface allows information (such as an image, a prompt, user inputs, etc.) to be communicated between user 105 and image generation apparatus 115.

According to some aspects, a user device user interface enables user 105 to interact with user device 110. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

Image generation apparatus 115 is an example of, or includes aspects of, the corresponding element described with reference to FIGS. 5 and 13. According to some aspects, image generation apparatus 115 includes a computer-implemented network. In some embodiments, the computer-implemented network includes a machine learning model (such as the encoder and the first and second diffusion models described with reference to FIGS. 5-6 and 8). In some embodiments, image generation apparatus 115 also includes one or more processors, a memory subsystem, a communication interface, an I/O interface, one or more user interface components, and a bus as described with reference to FIG. 13. Additionally, in some embodiments, image generation apparatus 115 communicates with user device 110 and database 125 via cloud 120.

In some cases, image generation apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Further detail regarding the architecture of image generation apparatus 115 is provided with reference to FIGS. 5-8 and 13. Further detail regarding a process for image generation is provided with reference to FIGS. 2-4 and 9-11. Examples of a process for training a diffusion model are provided with reference to FIG. 12.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet.

Some large cloud networks have functions distributed over multiple locations from central servers. A server is designated an edge server if it has a direct or close connection to a user. In some cases, cloud 120 is limited to a single organization. In other examples, cloud 120 is available to many organizations.

In one example, cloud 120 includes a multi-layer communications network comprising multiple edge routers and core routers. In another example, cloud 120 is based on a local collection of switches in a single physical location. According to some aspects, cloud 120 provides communications between user device 110, image generation apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to image generation apparatus 115 and communicates with image generation apparatus 115 via cloud 120. According to some aspects, database 125 is included in image generation apparatus 115.

FIG. 2 shows an example of a method 200 for high-resolution image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, according to some aspects, an image generation system (such as the image generation system described with reference to FIGS. 1 and 8) generates a high-resolution image based on a prompt by generating a noiseless image at an intermediate diffusion step of a reverse diffusion process implemented by a first diffusion model, upsampling the noiseless image to a higher resolution, and generating an output image at the higher resolution based on the upsampled noiseless image.

By first generating the noiseless image at a lower resolution and then generating the output image based on the noiseless image, the image generation system is able to generate the output image in less time than a conventional diffusion model would take to generate an image of comparable quality at the same resolution. Furthermore, because the output image is generated at the higher resolution using the second diffusion model, the output image is provided at a higher quality than would be provided by generating the output image at a lower resolution and then upsampling the output image to the higher resolution. Finally, by upsampling the noiseless image generated at the intermediate diffusion step of the reverse diffusion process, rather than a noise-corrected noisy image generated at the intermediate diffusion step, the image generation system avoids a decrease in image quality associated with the noise correction process.

At operation 205, the system provides a prompt. In some cases, the operations of this step refer to, or may be performed by, a user as described with reference to FIG. 1. For example, in some cases, the user provides the prompt to an image generation apparatus (such as the image generation apparatus described with reference to FIG. 1) via a user interface provided by the image generation apparatus on a user device (such as the user device described with reference to FIG. 1). In some cases, the prompt is a text prompt describing intended content of the output image.

At operation 210, the system generates a low-resolution noiseless image based on the prompt at an intermediate diffusion step using a first diffusion model. In some cases, the operations of this step refer to, or may be performed by, an image generation apparatus as described with reference to FIGS. 1 and 5. For example, in some cases, the image generation apparatus generates the low-resolution noiseless image as described with reference to FIG. 9.

At operation 215, the system upsamples the low-resolution noiseless image. In some cases, the operations of this step refer to, or may be performed by, an image generation apparatus as described with reference to FIGS. 1 and 5. For example, in some cases, the image generation apparatus upsamples the low-resolution noiseless image as described with reference to FIG. 9.

At operation 220, the system generates a high-resolution image based on the upsampled image using a second diffusion model. In some cases, the operations of this step refer to, or may be performed by, an image generation apparatus as described with reference to FIGS. 1 and 5. For example, in some cases, the image generation apparatus generates the high-resolution image as described with reference to FIG. 9.

At operation 225, the system provides the high-resolution image to the user. In some cases, the operations of this step refer to, or may be performed by, an image generation apparatus as described with reference to FIGS. 1 and 5. For example, in some cases, the image generation apparatus provides the high-resolution image to the user via the user interface provided on the user device.

Figure 3:
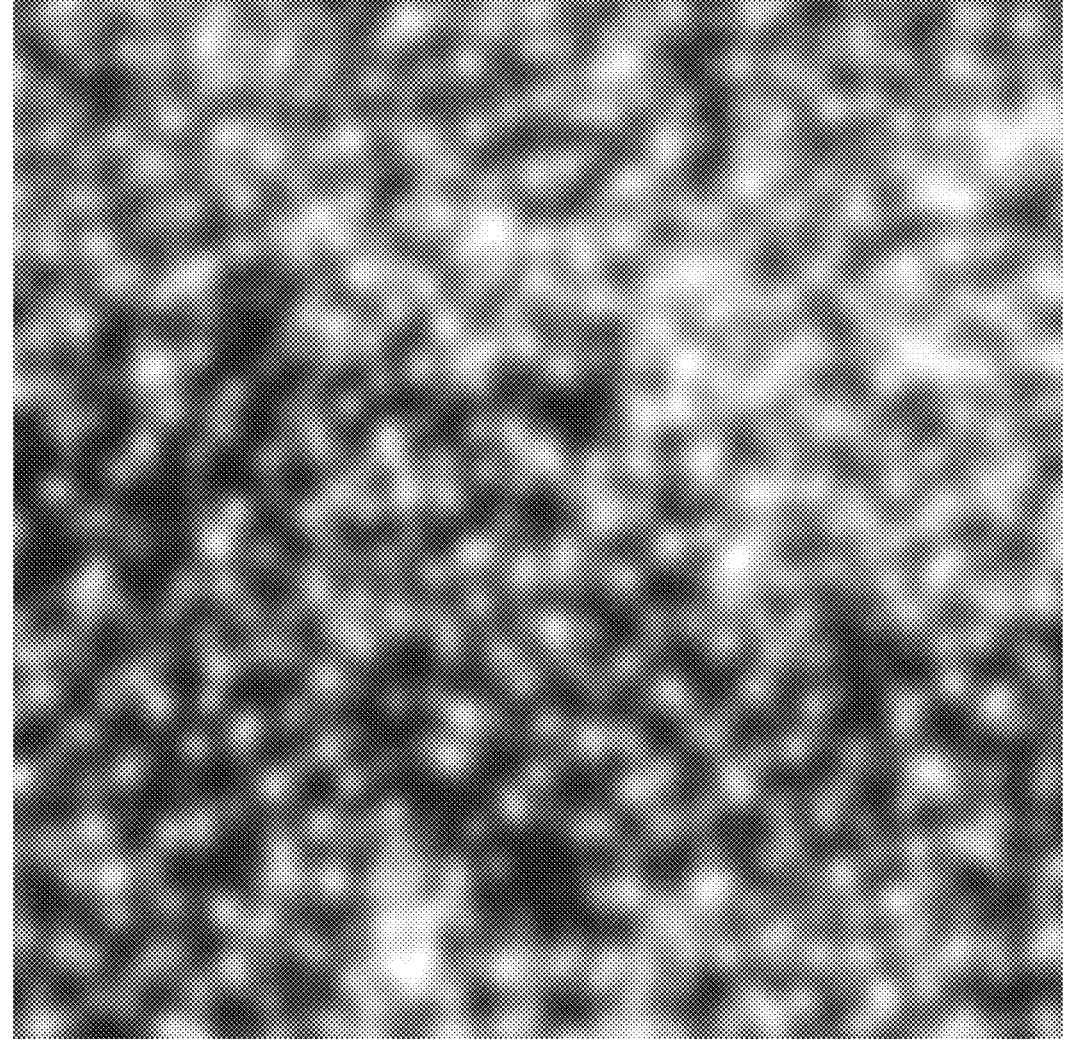
FIG. 3 shows an example of a comparative image generated based on an upsampled noisy image according to aspects of the present disclosure.

FIG. 3 shows an example of a comparative image 300 generated based on an upsampled noisy image according to aspects of the present disclosure. Referring to FIG. 3, comparative image 300 is an example of a high-resolution image that is generated by a comparative diffusion model based on an uncorrected noisy image that is generated at a lower resolution. Because the noisy image is upsampled, the noise in the noisy image is no longer isotropic and does not follow a Gaussian distribution, and the signal-to-noise ratio in the upsampled image is therefore incorrect. Because the signal-to-noise ratio is incorrect, the comparative diffusion model was not able to generate comparative image 300 such that comparative image 300 is an accurate depiction of its intended content (a dog).

Figure 4:
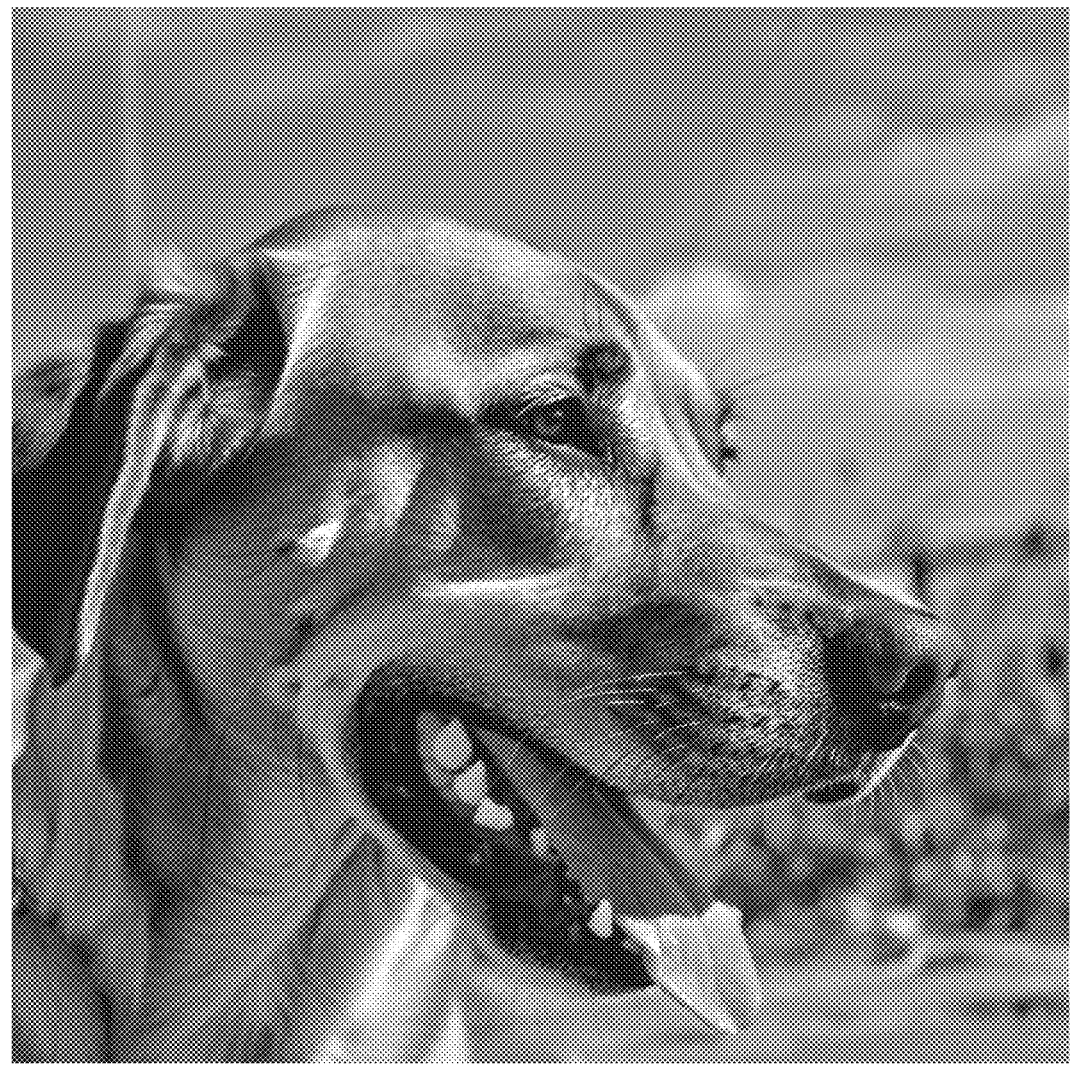
FIG. 4 shows an example of an image generated based on an upsampled noiseless image according to aspects of the present disclosure.

FIG. 4 shows an example of an image 400 generated based on an upsampled noiseless image according to aspects of the present disclosure. Referring to FIG. 4, image 400 is an example of an output image generated by a second diffusion model (such as the second diffusion model described with reference to FIGS. 5 and 8) based on an upsampled noiseless prediction provided by a first diffusion model (such as the first diffusion model described with reference to FIGS. 5 and 8) and an upsampling component (such as the upsampling component described with reference to FIGS. 5 and 8). Comparing image 400 to the image described with reference to FIG. 3, image 400 includes an accurate and high-quality representation of its intended content.

Figure 5:
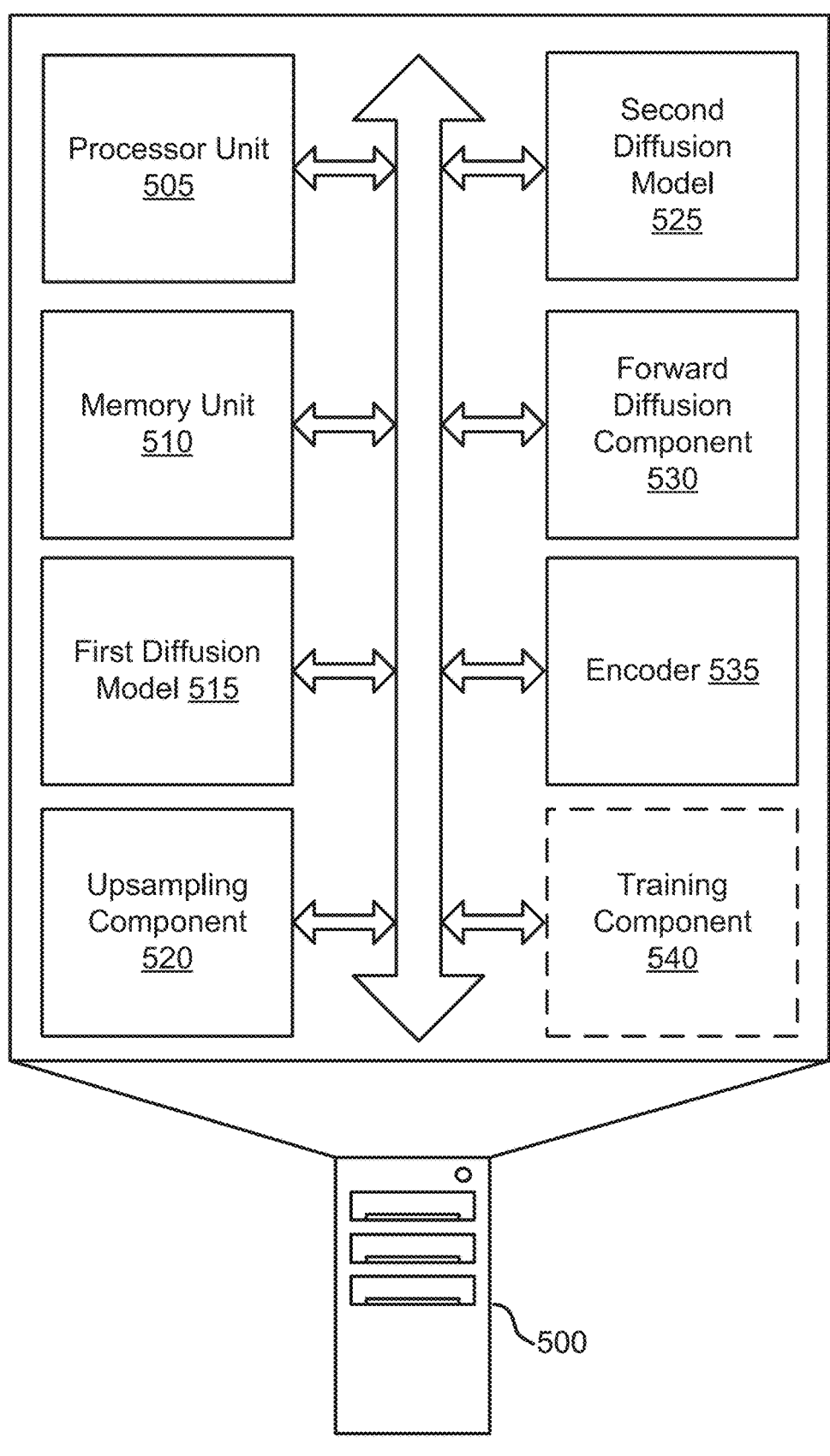
FIG. 5 shows an example of an image generation apparatus according to aspects of the present disclosure.

FIG. 5 shows an example of an image generation apparatus 500 according to aspects of the present disclosure. Image generation apparatus 500 is an example of, or includes aspects of, the corresponding element described with reference to FIG. 1. In one aspect, image generation apparatus 500 includes processor unit 505, memory unit 510, first diffusion model 515, upsampling component 520, second diffusion model 525, forward diffusion component 530, encoder 535, and training component 540.

Processor unit 505 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 505 is configured to operate a memory array using a memory controller. In other cases, a memory controller is integrated into processor unit 505. In some cases, processor unit 505 is configured to execute computer-readable instructions stored in memory unit 510 to perform various functions. In some aspects, processor unit 505 includes special purpose components for modem processing, baseband processing, digital signal processing, or transmission processing. According to some aspects, processor unit 505 comprises the one or more processors described with reference to FIG. 13.

Memory unit 510 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 505 to perform various functions described herein.

In some cases, memory unit 510 includes a basic input/output system (BIOS) that controls basic hardware or software operations, such as an interaction with peripheral components or devices. In some cases, memory unit 510 includes a memory controller that operates memory cells of memory unit 510. For example, the memory controller may include a row decoder, column decoder, or both. In some cases, memory cells within memory unit 510 store information in the form of a logical state. According to some aspects, memory unit 510 comprises the memory subsystem described with reference to FIG. 13.

According to some aspects, image generation apparatus 500 uses one or more processors of processor unit 505 to execute instructions stored in memory unit 510 to perform functions described herein. For example, in some cases, image generation apparatus 500 obtains a prompt. In some cases, the prompt comprises a text prompt.

First diffusion model 515 is an example of, or includes aspects of, the corresponding element described with reference to FIG. 8. According to some aspects, first diffusion model 515 is implemented as software stored in memory unit 510 and executable by processor unit 505, as firmware, as one or more hardware circuits, or as a combination thereof. According to some aspects, first diffusion model 515 comprises first parameters (e.g., machine learning parameters) stored in memory unit 510.

Machine learning parameters, also known as model parameters or weights, are variables that provide a behavior and characteristics of a machine learning model. Machine learning parameters can be learned or estimated from training data and are used to make predictions or perform tasks based on learned patterns and relationships in the data.

Machine learning parameters are typically adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Artificial neural networks (ANNs) have numerous parameters, including weights and biases associated with each neuron in the network, that control a degree of connections between neurons and influence the neural network's ability to capture complex patterns in data.

An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, first diffusion model 515 comprises one or more ANNs configured to generate a predicted denoised image at a first resolution, where the predicted denoised image is generated at a first intermediate diffusion step of first diffusion model 515. In some cases, first diffusion model 515 generates the predicted denoised image based on the prompt.

According to some aspects, first diffusion model 515 implements a reverse diffusion process (such as the first reverse diffusion process described with reference to FIG. 6). In some cases, first diffusion model 515 includes a U-Net (such as a U-Net described with reference to FIG. 7). In some aspects, first diffusion model 515 uses a first sampler to generate the predicted denoised image. In some cases, a "sampler" is a computational technique used to simulate samples from a probability distribution. In some cases, a diffusion model sampler simulates an evolution of a system over time, where the system's state at each time step is sampled from a probability distribution, using techniques such as Markov Chain Monte Carlo (MCMC) or Sequential Monte Carlo (SMC) methods. In some cases, a sampler iteratively updates the state of the system based on the observed data and the prior information, gradually converging to samples from a posterior distribution.

In some cases, diffusion model samplers are particularly useful in scenarios in which the dynamics of a system are not easily captured by simple parametric models because the samplers allow for an incorporation of complex temporal dependencies that can be used for tasks such as parameter estimation, uncertainty quantification, and model comparison in a Bayesian framework.

Upsampling component 520 is an example of, or includes aspects of, the corresponding element described with reference to FIGS. 6 and 8. In some aspects, upsampling component 520 is implemented as software stored in memory unit 510 and executable by processor unit 505, as firmware, as one or more hardware circuits, or as a combination thereof. In some cases, upsampling component 520 comprises upsampling parameters (e.g., machine learning parameters) stored in memory unit 510.

According to some aspects, upsampling component 520 upsamples the predicted denoised image to obtain an upsampled denoised image at a second resolution that is higher than the first resolution. According to some aspects, upsampling component 520 includes an image upsampling algorithm or hardware circuit configured to execute an image upsampling algorithm, where image upsampling includes increasing a spatial resolution of an image while maintaining a two-dimensional representation of the image. Examples of upsampling algorithms include bilinear upsampling, bicubic upsampling, and nearest neighbor upsampling. In some cases, upsampling component 520 comprises one or more ANNs configured to perform image upsampling.

Second diffusion model 525 is an example of, or includes aspects of, the corresponding element described with reference to FIG. 8. According to some aspects, second diffusion model 525 is implemented as software stored in memory unit 510 and executable by processor unit 505, as firmware, as one or more hardware circuits, or as a combination thereof. According to some aspects, second diffusion model 525 comprises second parameters (e.g., machine learning parameters) stored in memory unit 510.

According to some aspects, second diffusion model 525 comprises one or more ANNs configured to generate an output image at the second resolution based on the upsampled denoised image. In some aspects, second diffusion model 525 generates the output image based on the prompt. In some aspects, second diffusion model 525 performs a reverse diffusion process (such as a reverse diffusion process described with reference to FIG. 6) beginning with a second intermediate diffusion step. In some aspects, the second diffusion model 525 is trained independently of the first diffusion model 515.

In some aspects, second diffusion model 525 uses a second sampler different than the first sampler to generate the output image. In some aspects, the second sampler includes a stochastic differential equation (SDE) solver. In some cases, an SDE solver is a computational tool or algorithm designed to numerically approximate solutions to stochastic differential equations. Stochastic differential equations are mathematical models used to describe how systems evolve over time when subject to both deterministic and stochastic influences.

According to some aspects, second diffusion model 525 implements a reverse diffusion process (such as the second reverse diffusion process described with reference to FIG. 6). In some cases, second diffusion model 525 includes a U-Net (such as a U-Net described with reference to FIG. 7).

Forward diffusion component 530 is an example of, or includes aspects of, the corresponding element described with reference to FIG. 8. According to some aspects, forward diffusion component 530 is implemented as software stored in memory unit 510 and executable by processor unit 505, as firmware, as one or more hardware circuits, or as a combination thereof.

In some examples, forward diffusion component 530 performs a forward diffusion process (such as the forward diffusion process described with reference to FIG. 6) on the upsampled denoised image to obtain an intermediate input image corresponding to a second intermediate diffusion step of the second diffusion model 525. In some cases, second diffusion model 525 generates the output image based on the intermediate input image. In some examples, forward diffusion component 530 adds noise to the upsampled denoised image, where the forward diffusion process is performed based on the added noise.

Encoder 535 is an example of, or includes aspects of, the corresponding element described with reference to FIGS. 6 and 8. According to some aspects, encoder 535 is implemented as software stored in memory unit 510 and executable by processor unit 505, as firmware, as one or more hardware circuits, or as a combination thereof. According to some aspects, encoder 535 comprises encoder parameters (e.g., machine learning parameters) stored in memory unit 510.

According to some aspects, encoder 535 comprises one or more ANNs configured to encode the prompt to obtain a prompt embedding. In some cases, first diffusion model 515, second diffusion model 525, or a combination thereof use the prompt embedding as input.

In some cases, encoder 535 includes a text encoder. In some cases, the text encoder comprises a recurrent neural network (RNN), a transformer, or other ANN suitable for encoding textual information.

A recurrent neural network (RNN) is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). In some cases, an RNN includes one or more finite impulse recurrent networks (characterized by nodes forming a directed acyclic graph), one or more infinite impulse recurrent networks (characterized by nodes forming a directed cyclic graph), or a combination thereof.

In some cases, a transformer comprises one or more ANNs comprising attention mechanisms that enable the transformer to weigh an importance of different words or tokens within a sequence. In some cases, a transformer processes entire sequences simultaneously in parallel, making the transformer highly efficient and allowing the transformer to capture long-range dependencies more effectively.

An attention mechanism is a key component in some ANN architectures, particularly ANNs employed in natural language processing (NLP) and sequence-to-sequence tasks, that allows an ANN to focus on different parts of an input sequence when making predictions or generating output.

NLP refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. In some cases, these models express the relative probability of multiple answers.

Some sequence models (such as recurrent neural networks) process an input sequence sequentially, maintaining an internal hidden state that captures information from previous steps. However, in some cases, this sequential processing leads to difficulties in capturing long-range dependencies or attending to specific parts of the input sequence.

The attention mechanism addresses these difficulties by enabling an ANN to selectively focus on different parts of an input sequence, assigning varying degrees of importance or attention to each part. The attention mechanism achieves the selective focus by considering a relevance of each input element with respect to a current state of the ANN.

In some cases, an ANN employing an attention mechanism receives an input sequence and maintains its current state, which represents an understanding or context. For each element in the input sequence, the attention mechanism computes an attention score that indicates the importance or relevance of that element given the current state. The attention scores are transformed into attention weights through a normalization process, such as applying a softmax function. The attention weights represent the contribution of each input element to the overall attention. The attention weights are used to compute a weighted sum of the input elements, resulting in a context vector. The context vector represents the attended information or the part of the input sequence that the ANN considers most relevant for the current step. The context vector is combined with the current state of the ANN, providing additional information and influencing subsequent predictions or decisions of the ANN.

In some cases, by incorporating an attention mechanism, an ANN dynamically allocates attention to different parts of the input sequence, allowing the ANN to focus on relevant information and capture dependencies across longer distances.

In some cases, calculating attention involves three basic steps. First, a similarity between a query vector Q and a key vector K obtained from the input is computed to generate attention weights. In some cases, similarity functions used for this process include dot product, splice, detector, and the like. Next, a softmax function is used to normalize the attention weights. Finally, the attention weights are weighed together with their corresponding values V. In the context of an attention network, the key K and value V are typically vectors or matrices that are used to represent the input data. The key K is used to determine which parts of the input the attention mechanism should focus on, while the value V is used to represent the actual data being processed.

In some cases, a transformer comprises an encoder-decoder structure. In some cases, the encoder of the transformer processes an input sequence and encodes the input sequence into a set of high-dimensional representations. In some cases, the decoder of the transformer generates an output sequence based on the encoded representations and previously generated tokens. In some cases, the encoder and the decoder are composed of multiple layers of self-attention mechanisms and feed-forward ANNs.

In some cases, the self-attention mechanism allows the transformer to focus on different parts of an input sequence while computing representations for the input sequence. In some cases, the self-attention mechanism captures relationships between words of a sequence by assigning attention weights to each word based on a relevance to other words in the sequence, thereby enabling the transformer to model dependencies regardless of a distance between words.

In some cases, encoder 535 includes an image encoder trained for encoding visual information, such as a convolutional neural network (CNN). A CNN is a class of ANN that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During a training process, the filters may be modified so that they activate when they detect a particular feature within the input.

According to some aspects, encoder 535 includes a multimodal encoder trained to process and represent information from multiple modalities, such as text, images, audio, or other types of data, in a multimodal embedding space. In some cases, the multimodal encoder combines information from different modalities into a unified representation that can be further used for downstream tasks like classification, generation, or retrieval.

According to some aspects, training component 540 is implemented as software stored in memory unit 510 and executable by processor unit 505, as firmware, as one or more hardware circuits, or as a combination thereof. According to some aspects, training component 540 is omitted from image generation apparatus 500. According to some aspects, training component 540 is implemented in at least one apparatus separate from image generation apparatus 500 (for example, at least one apparatus comprised in a cloud, such as the cloud described with reference to FIG. 1). According to some aspects, the separate apparatus comprising training component 540 communicates with image generation apparatus 500 (for example, via the cloud) to perform the functions of training component 540 described herein. According to some aspects, training component 540 is configured to train first diffusion model 515 and second diffusion model 525. In some aspects, training component 540 is further configured to train second diffusion model 525 independently of first diffusion model 515.

Figure 6:
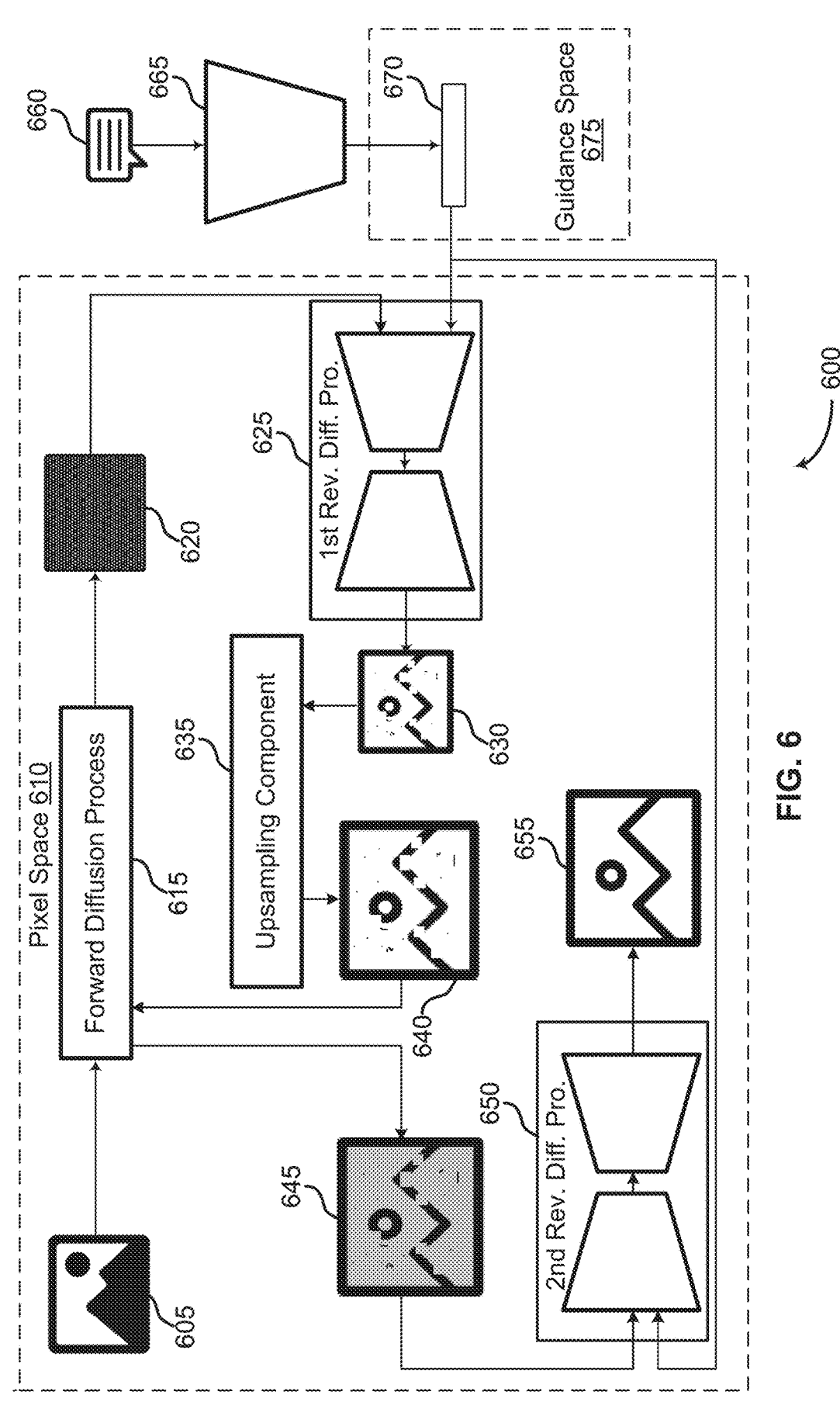
FIG. 6 shows an example of a guided diffusion architecture according to aspects of the present disclosure.

FIG. 6 shows an example of a guided diffusion architecture 600 according to aspects of the present disclosure. Diffusion models are a class of generative ANNs that can be trained to generate new data with features similar to features found in training data. In particular, diffusion models can be used to generate novel images. Diffusion models can be used for various image generation tasks, including image super-resolution, generation of images with perceptual metrics, conditional generation (e.g., generation based on text guidance), image inpainting, and image manipulation.

Diffusion models function by iteratively adding noise to data during a forward diffusion process and then learning to recover the data by denoising the data during a reverse diffusion process. Examples of diffusion models include Denoising Diffusion Probabilistic Models (DDPMs) and Denoising Diffusion Implicit Models (DDIMs). In DDPMs, a generative process includes reversing a stochastic Markov diffusion process. On the other hand, DDIMs use a deterministic process so that a same input results in a same output. Diffusion models may also be characterized by whether noise is added to an image itself, as in pixel diffusion, or to image features generated by an encoder, as in latent diffusion.

For example, according to some aspects, forward diffusion process 615 gradually adds noise to original image 605 to obtain noise images 620 at various noise levels. In some cases, forward diffusion process 615 is implemented by a forward diffusion component (such as the forward diffusion component described with reference to FIGS. 5 and 8).

According to some aspects, first reverse diffusion process 625 gradually removes the noise from noise images 620 at the various noise levels at various diffusion steps to obtain predicted denoised image 630. In some cases, a predicted denoised image 630 is created from each of the various noise levels. For example, in some cases, at each diffusion step of first reverse diffusion process 625, a first diffusion model (such as the first diffusion model described with reference to FIGS. 5 and 8) makes a prediction of a partially denoised image, where the partially denoised image is a combination of a predicted denoised image (e.g., a predicted final output) and noise for that diffusion step. Therefore, in some cases, each predicted denoised image can be thought of as the first diffusion model's prediction of a final noiseless output at each diffusion step, and each predicted denoised image 630 can therefore be thought of as an "early" prediction of a final output at a respective diffusion step of first reverse diffusion process 625.

According to some aspects, a predicted denoised image 630 is provided to upsampling component 635 (such as the upsampling component described with reference to FIGS. 5 and 8). In some cases, upsampling component 635 upsamples the predicted denoised image 630 to output upsampled denoised image 640 at a higher resolution. In some cases, forward diffusion process 615 gradually adds isotropic noise to upsampled denoised image 640 at various noise levels to obtain intermediate input images 645. In some cases, an intermediate input image 645 can be thought of as an upscaled version of the partially denoised image at the time step of first reverse diffusion process 625 corresponding to the predicted denoised image 630, where the intermediate input image 645 includes a Gaussian distribution of noise.

According to some aspects, second reverse diffusion process 650 gradually removes noise from intermediate noise images 645 to obtain output image 655 at the higher resolution. In some cases, an output image 655 is created from each of the various noise levels.

In some cases, each of first reverse diffusion process 625 and second reverse diffusion process 650 are implemented via a U-Net ANN (such as the U-Net architecture described with reference to FIG. 7). Forward diffusion process 615, first reverse diffusion process 625, and second reverse diffusion process 650 are examples of, or include aspects of, the corresponding elements described with reference to FIG. 10.

In some cases, each of first reverse diffusion process 625 and second reverse diffusion process 650 are guided based on a prompt 660, such as a text prompt, an image, a layout, a segmentation map, etc. Prompt 660 can be encoded using encoder 665 (in some cases, a multi-modal encoder) to obtain guidance features 670 (e.g., a prompt embedding) in guidance space 675.

According to some aspects, guidance features 675 are respectively combined with noise images 620 and intermediate input images 645 at one or more layers of first reverse diffusion process 620 and second reverse diffusion process 650 to guide predicted denoised image 630 and output image 655 towards including content described by prompt 660. For example, guidance features 670 can be respectively combined with noise images 620 and intermediate input images 645 using cross-attention blocks within first reverse diffusion process 625 and second reverse diffusion process 650. In some cases, guidance features 670 can be weighted so that guidance features 670 have a greater or lesser representation in predicted denoised image 630 and output image 655.

Cross-attention, also known as multi-head attention, is an extension of the attention mechanism used in some ANNs for NLP tasks. In some cases, cross-attention enables each of first reverse diffusion process 625 and second reverse diffusion process 650 to attend to multiple parts of an input sequence simultaneously, capturing interactions and dependencies between different elements. In cross-attention, there are typically two input sequences: a query sequence and a key-value sequence. The query sequence represents the elements that require attention, while the key-value sequence contains the elements to attend to. In some cases, to compute cross-attention, the cross-attention block transforms (for example, using linear projection) each element in the query sequence into a "query" representation, while the elements in the key-value sequence are transformed into "key" and "value" representations.

The cross-attention block calculates attention scores by measuring a similarity between each query representation and the key representations, where a higher similarity indicates that more attention is given to a key element. An attention score indicates an importance or relevance of each key element to a corresponding query element.

The cross-attention block then normalizes the attention scores to obtain attention weights (for example, using a softmax function), where the attention weights determine how much information from each value element is incorporated into the final attended representation. By attending to different parts of the key-value sequence simultaneously, the cross-attention block captures relationships and dependencies across the input sequences, allowing each of first reverse diffusion process 625 and second reverse diffusion process 650 to better understand the context and generate more accurate and contextually relevant outputs.

As shown in FIG. 6, guided diffusion architecture 600 is implemented according to a pixel diffusion model. According to some aspects, guided diffusion architecture 600 is implemented according to a latent diffusion model. In a latent diffusion model, forward and reverse diffusion processes occur in a latent space, rather than a pixel space.

For example, in some cases, an image encoder encodes original image 605 as image features in a latent space. In some cases, forward diffusion process 615 adds noise to the image features, rather than original image 605, to obtain noisy image features. In some cases, first reverse diffusion process 625 gradually removes noise from the noisy image features (in some cases, guided by guidance features 670) to obtain predicted denoised image features at an intermediate step of first reverse diffusion process 625. In some cases, an upsampling component upsamples the predicted denoised image features to obtain upsampled image features. In some cases, forward diffusion process 615 gradually adds noise to the upsampled image features to obtain intermediate image features. In some cases, second reverse diffusion process 650 gradually removes noise from the intermediate image features to obtain output image features.

In some cases, an image decoder decodes the output image features to obtain output image 655 in pixel space 610. In some cases, as a size of image features in a latent space can be significantly smaller than a resolution of an image in a pixel space (e.g., 32×32, 64×64, etc. compared to 256×256, 512×512, etc.), encoding original image 605 to obtain the image features can reduce inference time by a large amount.

Figure 7:
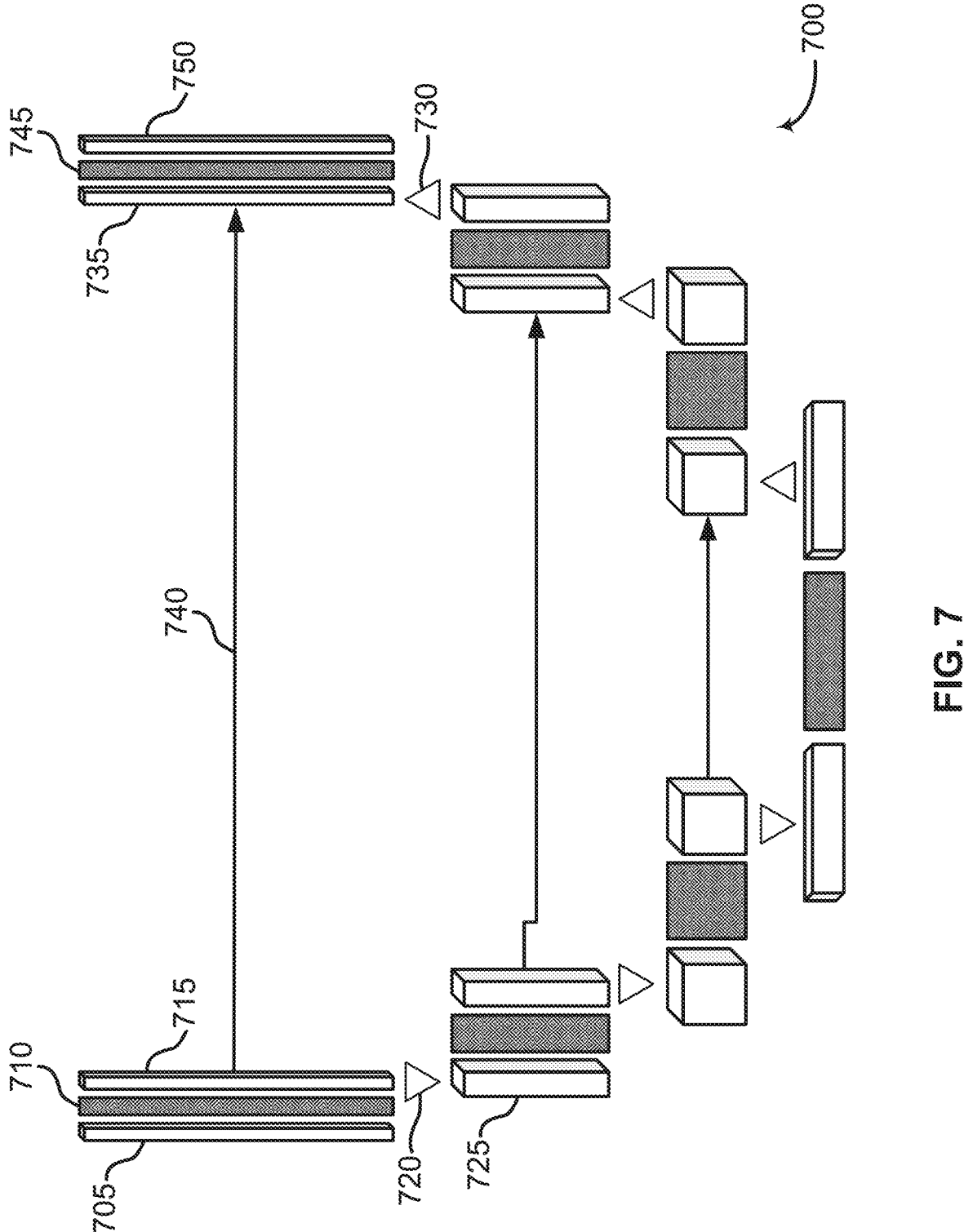
FIG. 7 shows an example of a U-Net according to aspects of the present disclosure.

FIG. 7 shows an example of a U-Net 700 according to aspects of the present disclosure. According to some aspects, a diffusion model (such as the first diffusion model or the second diffusion model described with reference to FIGS. 5 and 8) comprises an ANN architecture known as a U-Net. In some cases, U-Net 700 implements reverse diffusion processes described with reference to FIGS. 6, 8, 10, and 12.

According to some aspects, U-Net 700 receives input features 705, where input features 705 include an initial resolution and an initial number of channels, and processes input features 705 using an initial neural network layer 710 (e.g., a convolutional neural network layer) to produce intermediate features 715.

In some cases, intermediate features 715 are then down-sampled using a down-sampling layer 720 such that down-sampled features 725 have a resolution less than the initial resolution and a number of channels greater than the initial number of channels.

In some cases, this process is repeated multiple times, and then the process is reversed. For example, down-sampled features 725 are up-sampled using up-sampling process 730 to obtain up-sampled features 735. In some cases, up-sampled features 735 are combined with intermediate features 715 having a same resolution and number of channels via skip connection 740. In some cases, the combination of intermediate features 715 and up-sampled features 735 are processed using final neural network layer 745 to produce output features 750. In some cases, output features 750 have the same resolution as the initial resolution and the same number of channels as the initial number of channels.

According to some aspects, U-Net 700 receives additional input features to produce a conditionally generated output. In some cases, the additional input features include a vector representation of a prompt. In some cases, the additional input features are combined with intermediate features 715 within U-Net 700 at one or more layers. For example, in some cases, a cross-attention module is used to combine the additional input features and intermediate features 715.

Figure 8:
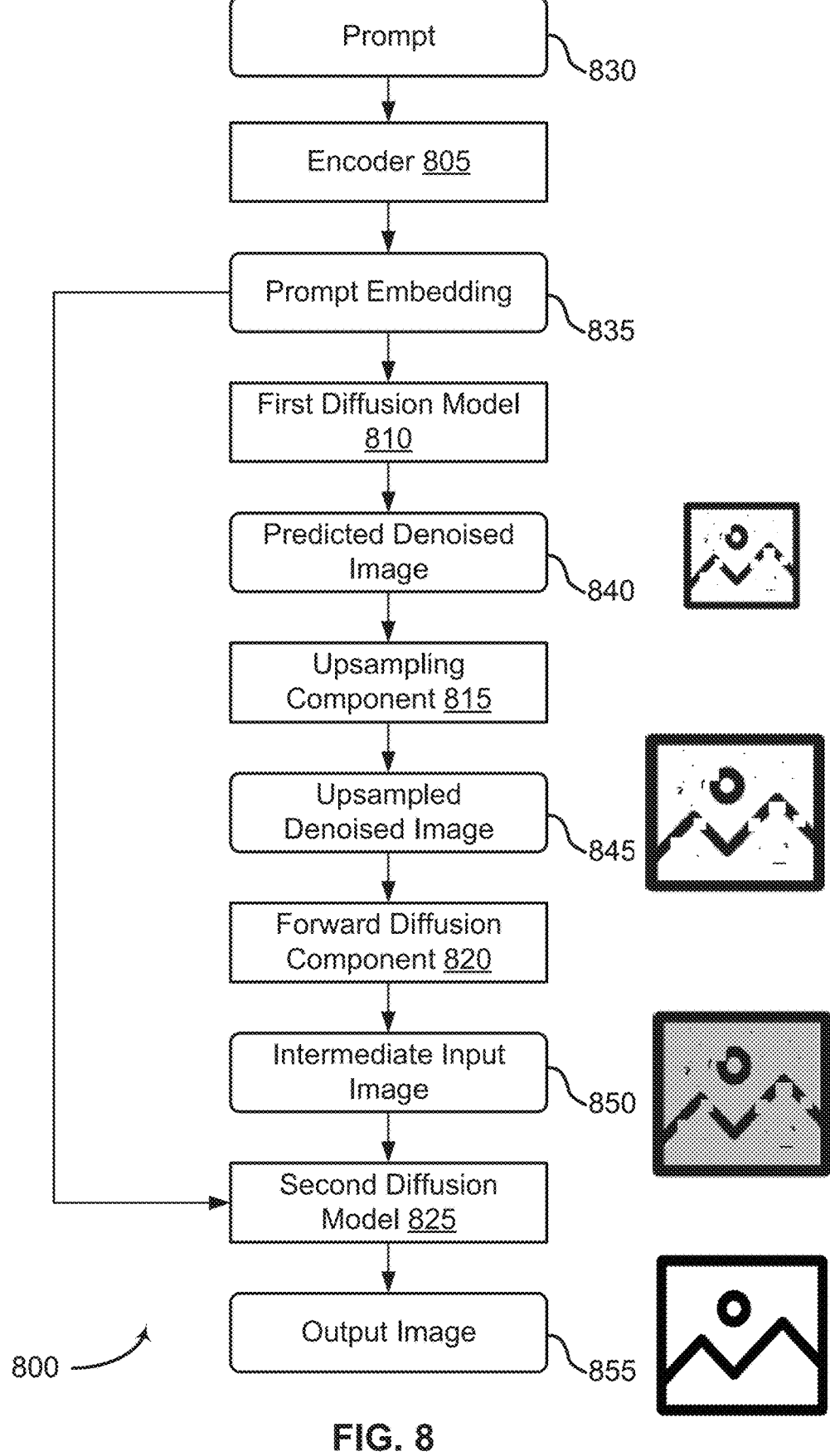
FIG. 8 shows an example of data flow in an image generation system according to aspects of the present disclosure.

FIG. 8 shows an example of data flow in image generation system 800 according to aspects of the present disclosure. The example shown includes image generation system 800, prompt 830, prompt embedding 835, predicted denoised image 840, upsampled denoised image 845, intermediate input image 850, and output image 855.

Image generation system 800 is an example of, or includes aspects of, the corresponding element described with reference to FIG. 1. In one aspect, image generation system 800 includes encoder 805, first diffusion model 810, upsampling component 815, forward diffusion component 820, and second diffusion model 825.

Encoder 805 is an example of, or includes aspects of, the corresponding element described with reference to FIGS. 5 and 6. First diffusion model 810 is an example of, or includes aspects of, the corresponding element described with reference to FIG. 5. Upsampling component 815 is an example of, or includes aspects of, the corresponding element described with reference to FIGS. 5 and 6. Forward diffusion component 820 is an example of, or includes aspects of, the corresponding element described with reference to FIG. 5. Second diffusion model 825 is an example of, or includes aspects of, the corresponding element described with reference to FIG. 5.

Referring to FIG. 8, according to some aspects, encoder 805 receives prompt 830. In some cases, encoder 805 encodes prompt 830 to obtain prompt embedding 835. In some cases, encoder 805 provides prompt embedding 835 to first diffusion model 810. In some cases, first diffusion model 810 generates predicted denoised image 840 based on prompt embedding 835.

According to some aspects, upsampling component 815 upsamples predicted denoised image 840 to a higher resolution to obtain upsampled denoised image 845. In some cases, forward diffusion component 820 adds noise to upsampled denoised image 845 to obtain intermediate input image 850.

According to some aspects, second diffusion model 825 receives prompt embedding 835 and intermediate input image 850 as input. In some cases, second diffusion model 825 generates output image 855 based on prompt embedding 835 and intermediate input image 850.

Image Generation

A method for image generation is described with reference to FIGS. 9-10. One or more aspects of the method include obtaining a prompt; generating, using a first diffusion model, a predicted denoised image at a first resolution based on the prompt, wherein the predicted denoised image is generated at a first intermediate diffusion step of the first diffusion model; upsampling the predicted denoised image to obtain an upsampled denoised image at a second resolution that is higher than the first resolution; and generating, using a second diffusion model, an output image at the second resolution based on the prompt and the upsampled denoised image. In some aspects, the second diffusion model is trained independently of the first diffusion model.

Some examples of the method further include performing a forward diffusion process on the upsampled denoised image to obtain an intermediate input image corresponding to a second intermediate diffusion step of the second diffusion model, wherein the output image is generated based on the intermediate input image.

Some examples of the method further include adding noise to the upsampled denoised image, wherein the forward diffusion process is performed based on the added noise. In some aspects, the second diffusion model performs a reverse diffusion process beginning with a second intermediate diffusion step.

Some examples of the method further include encoding the prompt to obtain a prompt embedding, wherein the first diffusion model and the second diffusion model use the prompt embedding as input.

In some aspects, the first diffusion model uses a first sampler to generate the predicted denoised image and the second diffusion model uses a second sampler different than the first sampler to generate the output image. In some aspects, the second sampler comprises a stochastic differential equation (SDE) solver.

A method for image generation is described with reference to FIGS. 10-11. One or more aspects of the method include generating, using a first diffusion model, a predicted denoised image at a first resolution, wherein the predicted denoised image is generated at a first intermediate diffusion step of the first diffusion model; upsampling the predicted denoised image to obtain an upsampled denoised image at a second resolution that is higher than the first resolution; performing a forward diffusion process on the upsampled denoised image to obtain an intermediate input image corresponding to a second intermediate diffusion step of a second diffusion model; and generating, using the second diffusion model, an output image at the second resolution based on the intermediate input image. In some aspects, the second diffusion model is trained independently of the first diffusion model.

Some examples of the method further include adding noise to the upsampled denoised image, wherein the forward diffusion process is performed based on the added noise. In some aspects, the second diffusion model performs a reverse diffusion process beginning with a second intermediate diffusion step.

Some examples of the method further include encoding the prompt to obtain a prompt embedding, wherein the first diffusion model and the second diffusion model use the prompt embedding as input.

In some aspects, the first diffusion model uses a first sampler to generate the predicted denoised image and the second diffusion model uses a second sampler different than the first sampler to generate the output image. In some aspects, the second sampler comprises a stochastic differential equation (SDE) solver.

FIG. 9 shows an example of a method 900 for generating a high-resolution image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 9, according to some aspects of the present disclosure, a method is provided for generating a high-resolution image using multiple diffusion models. For example, in some cases, a first diffusion model generates a predicted denoised image at a first resolution and at an intermediate (e.g., non-final) diffusion step of a first reverse diffusion process.

In some cases, during each diffusion step of a reverse diffusion process, a diffusion model predicts a partially denoised image based on a noisy input image, where the partially denoised image can be considered to be a combination of the diffusion step's prediction of a fully denoised image (e.g., an output image) and noise. In other words, in some cases, at each diffusion step, a prediction of an output image is made, and the prediction of the output image becomes increasingly accurate as the reverse diffusion process progresses. Therefore, in some cases, the predicted denoised image generated at the intermediate diffusion step can be considered as an "incomplete" prediction of an output image.

In some cases, the predicted denoised image is upsampled to a higher resolution than the first resolution to obtain an intermediate input image, and then a second diffusion model generates the output image at the higher resolution based on the intermediate input image.

According to some aspects, by first generating the partially denoised image at a lower resolution and then generating the output image at the higher resolution based on the partially denoised image, the output image is provided in less time than an image of comparable quality and resolution would be by generating the comparative image using a conventional approach of performing a reverse diffusion process exclusively at the higher resolution.

Furthermore, according to some aspects, by upsampling the predicted denoised image generated at the intermediate diffusion step of the first reverse diffusion process, the image generation system avoids having to correct a signal-to-noise ratio in the upsampled predicted denoised image (as the predicted denoised image does not include noise).

By contrast, a conventional approach uses a comparative first diffusion model to generate a partially denoised image at an intermediate diffusion step of a comparative reverse diffusion process, upsamples the partially denoised image to a higher resolution (which causes the distribution of noise in the upsampled partially denoised image to be non-Gaussian, and therefore unsuitable for use in the reverse diffusion process), adds noise to the upsampled partially denoised image so that the noise distribution is again Gaussian, and generates a comparative output image using a comparative second diffusion model based on the corrected, upsampled partially denoised image. According to some aspects, because the upsampled predicted denoised image does not include noise, no noise correction for the upsampled predicted denoised image is needed, and therefore the output image is more accurate than the comparative output image because errors introduced by the noise correction are avoided.

Finally, according to some aspects, the predicted denoised image can be considered as an "incomplete" or "preliminary" output image that partially depicts intended content for the output image, and the output image can be considered as a completion of the predicted denoised image that fully depicts the intended content. Accordingly, in some cases, the output image generated based on an upsampled predicted denoised image includes a more accurate depiction of the intended content than a comparative output image generated by upsampling a "complete" output image of a comparative diffusion model from a lower resolution to the higher resolution.

At operation 905, the system obtains a prompt. In some cases, the operations of this step refer to, or may be performed by, an image generation apparatus as described with reference to FIGS. 1 and 5. For example, in some cases, a user (such as the user described with reference to FIG. 1) provides the prompt to the image generation apparatus via a user device (such as the user described with reference to FIG. 1). In some cases, the user provides the prompt via a user interface provided on the user device by the image generation apparatus. In some cases, the image generation apparatus retrieves the prompt from a database (such as the database described with reference to FIG. 1).

In some cases, the prompt is a text prompt comprising text. In some cases, the prompt is an image prompt comprising an image. In some cases, the prompt is a prompt comprising content in a non-text, non-image modality (such as audio). In some cases, the prompt includes information that describes intended content of an output image to be generated by the image generation apparatus.

At operation 910, the system generates, using a first diffusion model, a predicted denoised image at a first resolution based on the prompt, where the predicted denoised image is generated at a first intermediate diffusion step of the first diffusion model. In some cases, the operations of this step refer to, or may be performed by, a first diffusion model as described with reference to FIGS. 5 and 8.

For example, in some cases, a forward diffusion component (such as the forward diffusion component described with reference to FIGS. 5 and 8) generates a noisy image using a forward diffusion process (such as the forward diffusion process described with reference to FIGS. 6 and 10). In some cases, the first diffusion model generates the predicted denoised image using a reverse diffusion process (such as the first reverse diffusion process described with reference to FIG. 6 and the reverse diffusion process described with reference to FIG. 10).

In some cases, an encoder (such as the encoder described with reference to FIGS. 5-6 and 8) encodes the prompt to obtain a prompt embedding. In some cases, the first diffusion model uses the prompt embedding as input. For example, in some cases, the first diffusion model generates the predicted denoised image using the prompt embedding as a guidance feature. In some cases, the first diffusion model uses a first sampler to generate the predicted noise image.

At operation 915, the system upsamples the predicted denoised image to obtain an upsampled denoised image at a second resolution (e.g., 128×128 pixels) that is higher than the first resolution (e.g., 64×64 pixels). In some cases, the operations of this step refer to, or may be performed by, a upsampling component as described with reference to FIGS. 5 and 8.

At operation 920, the system generates, using a second diffusion model, an output image at the second resolution based on the prompt and the upsampled denoised image. In some cases, the operations of this step refer to, or may be performed by, a second diffusion model as described with reference to FIGS. 5 and 8.

For example, in some cases, the forward diffusion component performs a forward diffusion process (such as the forward diffusion process described with reference to FIGS. 6 and 10) on the upsampled denoised image to obtain an intermediate input image corresponding to a second intermediate diffusion step of the second diffusion model. In some cases, the second intermediate diffusion step is the same as the first intermediate diffusion step. In some cases, the second intermediate diffusion step is different than the first intermediate diffusion step. In some cases, the forward diffusion model adds noise to the upsampled denoised image, where the forward diffusion process is based on the added noise. In some cases, because the noise is added using a forward diffusion process, a correct signal-to-noise ratio is maintained in the intermediate input image.

In some cases, the second diffusion model performs a reverse diffusion process (such as the second reverse diffusion process described with reference to FIG. 6 and a reverse diffusion process described with reference to FIG. 10) beginning with the second intermediate diffusion step to obtain the output image based on the intermediate input image.

In some cases, the second diffusion model uses the prompt embedding as input. For example, in some cases, the second diffusion model generates the output image using the prompt embedding as a guidance feature. In some cases, the output image depicts content described by the prompt.

In some cases, the second diffusion model uses a second sampler to generate the output image. In some cases, the second sampler is different from the first sampler. In some cases, the second sampler includes a stochastic differential equation (SDE) solver. In some cases, using the SDE solver allows for more robust upsampling, where the added noise perturbs the resized image. In some cases, this reduces the impact of potential artifacts from the previous steps.

In some cases, the image generation apparatus provides the output image to the user. For example, in some cases, the image generation apparatus displays the output image to the user via the user interface provided on the user device by the image generation apparatus.

Figure 10:
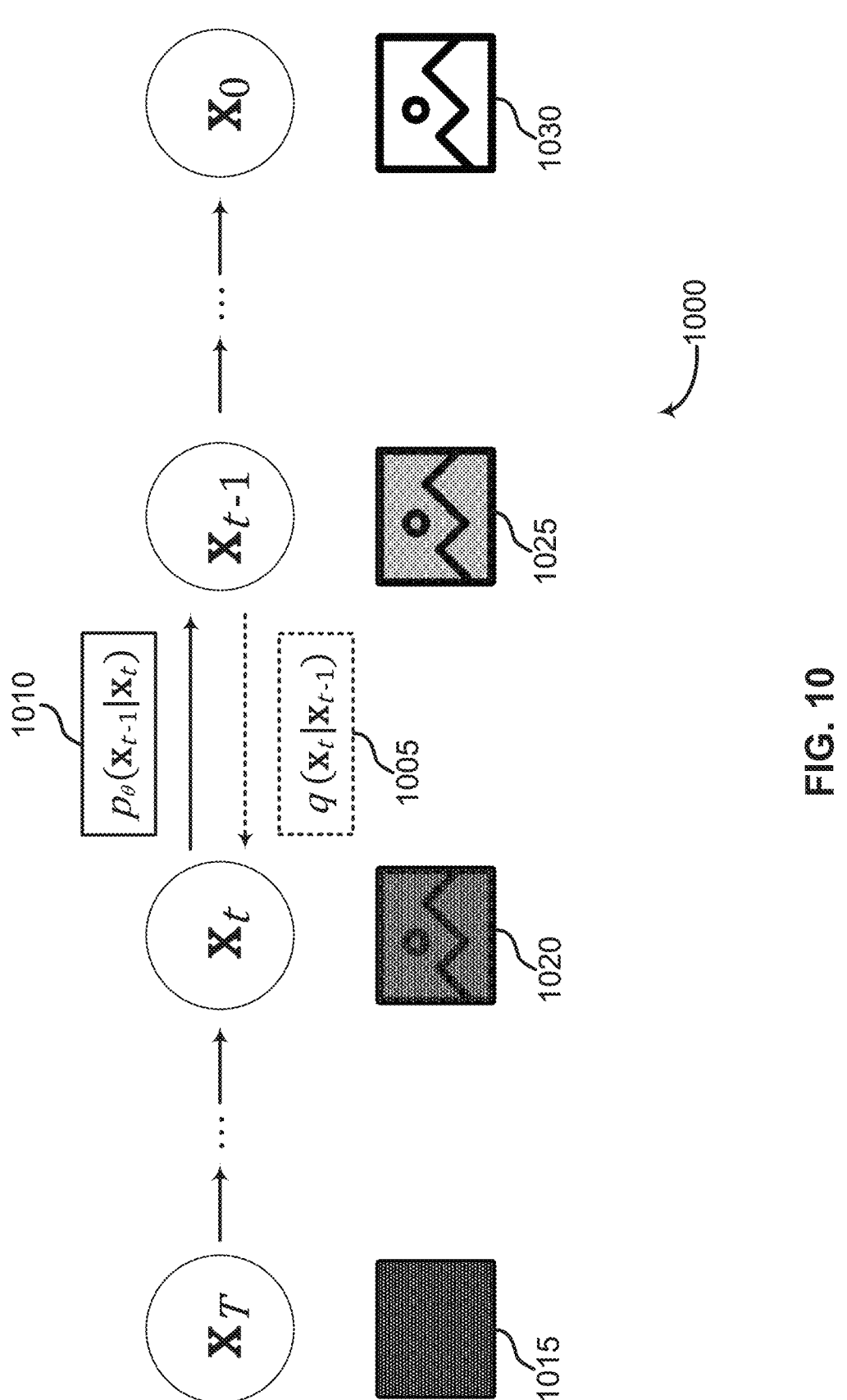
FIG. 10 shows an example of diffusion processes according to aspects of the present disclosure.

FIG. 10 shows an example 1000 of diffusion processes according to aspects of the present disclosure. The example shown includes forward diffusion process 1005 (such as the forward diffusion process described with reference to FIG. 6) and reverse diffusion process 1010 (such as the first reverse diffusion process and the second reverse diffusion process described with reference to FIG. 6). In some cases, forward diffusion process 1005 adds noise to an image (or image features in a latent space). In some cases, reverse diffusion process 1010 denoises the image (or image features in the latent space) to obtain a denoised image.

According to some aspects, a forward diffusion component (such as the forward diffusion component described with reference to FIGS. 5-6 and 8) uses forward diffusion process 1005 to iteratively add Gaussian noise to an input at each diffusion step t according to a known variance schedule $0 < \beta_1 < \beta_2 < \ldots < \beta_T < 1$:

$$q(x_t \mid x_{t-1}) = \mathcal{N}\left(x_t; \sqrt{1 - \beta_t}\, x_{t-1}, \beta_t I\right) \tag{1}$$

According to some aspects, the Gaussian noise is drawn from a Gaussian distribution with mean $\mu_t = \sqrt{1 - \beta_t} x_{t-1}$ and variance $\sigma^2 = \beta_t \geq 1$ by sampling $\epsilon \sim \mathcal{N}(0, I)$ and setting $x_t = \sqrt{1 - \beta_t} x_{t-1} + \sqrt{\beta_t} \epsilon$. Accordingly, beginning with an initial input $x_0$, forward diffusion process 1005 produces $x_1, \ldots, x_t, \ldots x_T$, where $x_T$ is pure Gaussian noise.

In some cases, an observed variable $x_0$ (such as original image 1030) is mapped in either a pixel space or a latent space to intermediate variables $x_1, \ldots, x_T$ using a Markov chain, where the intermediate variables $x_1, \ldots, x_T$ have a same dimensionality as the observed variable $x_0$. In some cases, the Markov chain gradually adds Gaussian noise to the observed variable $x_0$ or to the intermediate variables $x_1, \ldots, x_T$, respectively, to obtain an approximate posterior $q(x_{1:T} | x_0)$.

According to some aspects, during reverse diffusion process 1010, a diffusion model (such as the first diffusion model or the second diffusion model described with reference to FIGS. 5 and 8) gradually removes noise from $x_T$ to obtain a prediction of the observed variable $x_0$ (e.g., a representation of what the diffusion model thinks the original image 1030 should be). In some cases, the prediction is influenced by a guidance prompt or a guidance vector (for example, a prompt or a prompt embedding described with reference to FIG. 6). A conditional distribution $p(x_{t-1} | x_t)$ of the observed variable $x_0$ is unknown to the diffusion model, however, as calculating the conditional distribution would require a knowledge of a distribution of all possible images. Accordingly, the diffusion model is trained to approximate (e.g., learn) a conditional probability distribution $p_\theta(x_{t-1} | x_t)$ of the conditional distribution $p(x_{t-1} | x_t)$:

$$p_\theta(x_{t-1} \mid x_t) = \mathcal{N}\left(x_{t-1}; \mu_\theta(x_t, t), \sum{}_\theta(x_t, t)\right) \tag{2}$$

In some cases, a mean of the conditional probability distribution $p_\theta(x_{t-1} | x_t)$ is parameterized by $\mu_\theta$ and a variance of the conditional probability distribution $p_\theta(x_{t-1} | x_t)$ is parameterized by $\Sigma_\theta$. In some cases, the mean and the variance are conditioned on a noise level t (e.g., an amount of noise corresponding to a diffusion step t). According to some aspects, the diffusion model is trained to learn the mean and/or the variance.

According to some aspects, the diffusion model initiates reverse diffusion process 1010 with noisy data $x_T$ (such as noisy image 1015). According to some aspects, the diffusion model iteratively denoises the noisy data $x_T$ to obtain the conditional probability distribution $p_\theta(x_{t-1} | x_t)$. For example, in some cases, at each step t−1 of reverse diffusion process 1010, the diffusion model takes $x_t$ (such as first intermediate image 1020) and t as input, where t represents a step in a sequence of transitions associated with different noise levels, and iteratively outputs a prediction of $x_{t-1}$ (such as second intermediate image 1025) until the noisy data $x_T$ is reverted to a prediction of the observed variable $x_0$ (e.g., a predicted image for original image 1030).

According to some aspects, a joint probability of a sequence of samples in the Markov chain is determined as a product of conditionals and a marginal probability:

$$x_T\colon\; p_\theta(x_{0:T}) := p(x_T) \prod{}_{t=1}^{T} p_\theta(x_{t-1} \mid x_t) \tag{3}$$

In some cases, $p(x_T) = \mathcal{N}(x_T; 0, I)$ is a pure noise distribution, as reverse diffusion process 1010 takes an outcome of forward diffusion process 1005 (e.g., a sample of pure noise $x_T$) as input, and $\prod_{t=1}^{T} p_\theta(x_{t-1} | x_t)$ represents a sequence of Gaussian transitions corresponding to a sequence of addition of Gaussian noise to a sample.

FIG. 11 shows an example of a method 1100 for generating a high-resolution image using an intermediate input image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system generates, using a first diffusion model, a predicted denoised image at a first resolution, wherein the predicted denoised image is generated at a first intermediate diffusion step of the first diffusion model. In some cases, the operations of this step refer to, or may be performed by, a first diffusion model as described with reference to FIGS. 5 and 8.

At operation 1110, the system upsamples the predicted denoised image to obtain an upsampled denoised image at a second resolution that is higher than the first resolution. In some cases, the operations of this step refer to, or may be performed by, an upsampling component as described with reference to FIGS. 5-6 and 8.

At operation 1115, the system performs a forward diffusion process on the upsampled denoised image to obtain an intermediate input image corresponding to a second intermediate diffusion step of the second diffusion model. In some cases, the operations of this step refer to, or may be performed by, a forward diffusion component as described with reference to FIGS. 5 and 8.

At operation 1120, the system generates, using a second diffusion model, an output image at the second resolution based on the intermediate input image. In some cases, the operations of this step refer to, or may be performed by, a second diffusion model as described with reference to FIGS. 5 and 8.

Training

Figure 12:
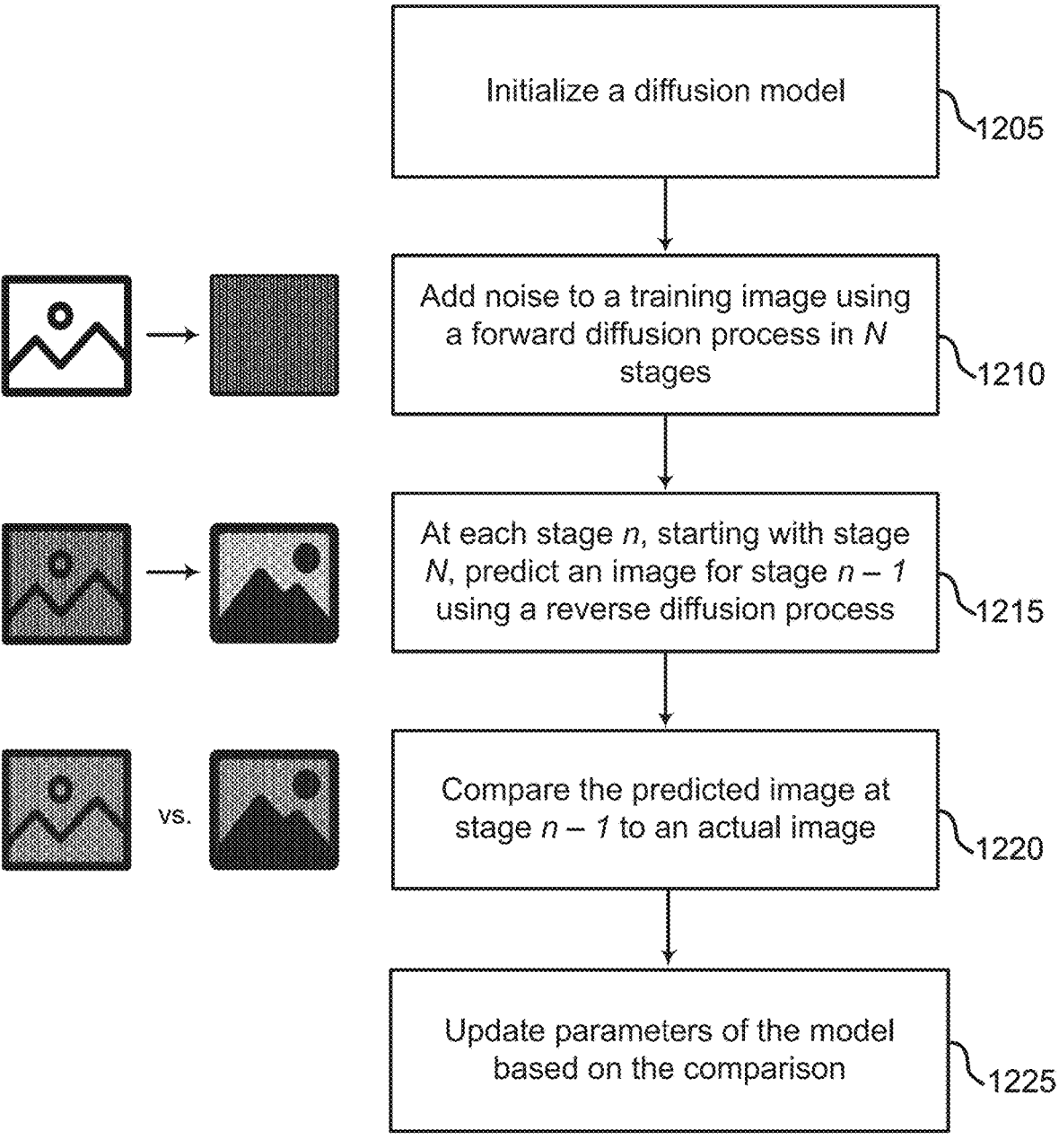
FIG. 12 shows an example of training a diffusion model according to aspects of the present disclosure.

FIG. 12 shows an example of a method 1200 for training a diffusion model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 12, according to some aspects, a training component (such as the training component described with reference to FIG. 5) trains a diffusion model (such as the first diffusion model or the second diffusion model described with reference to FIGS. 5 and 8) to generate an image.

At operation 1205, the system initializes the diffusion model. In some cases, the operations of this step refer to, or may be performed by, a training component as described with reference to FIG. 5. In some cases, the initialization includes defining the architecture of the diffusion model and establishing initial values for parameters of the diffusion model. In some cases, the training component initializes the diffusion model to implement a U-Net architecture (such as the U-Net architecture described with reference to FIG. 7). In some cases, the initialization includes defining hyperparameters of the architecture of the diffusion model, such as a number of layers, a resolution and channels of each layer block, a location of skip connections, and the like.

At operation 1210, the system adds noise to a training image using a forward diffusion process (such as the forward diffusion process described with reference to FIGS. 6 and 10) in N stages. In some cases, the operations of this step refer to, or may be performed by, a training component as described with reference to FIG. 5. In some cases, the training component retrieves the training image from a database (such as the database described with reference to FIG. 1).

At operation 1215, at each stage n, starting with stage N, the system predicts an image for stage n−1 using a reverse diffusion process (such as a reverse diffusion process described with reference to FIGS. 6 and 10). In some cases, the operations of this step refer to, or may be performed by, the diffusion model. In some cases, each stage n corresponds to a diffusion step t. In some cases, at each stage n, the diffusion model predicts noise that can be removed from an intermediate image to obtain a predicted image. In some cases, an original image is predicted at each stage of the training process.

In some cases, the reverse diffusion process is conditioned on the prompt. In some cases, an encoder (such as the encoder described with reference to FIGS. 5-6 and 8) obtains the prompt and generates the guidance features in a guidance space. In some cases, at each stage, the diffusion model predicts noise that can be removed from an intermediate image to obtain a predicted image that aligns with the guidance features.

At operation 1220, the system compares the predicted image at stage n−1 to an actual image, such as the image at stage n−1 or the original input image (e.g., the training image). In some cases, the operations of this step refer to, or may be performed by, a training component as described with reference to FIG. 5. In some cases, the training component computes a loss function based on the comparison.

A loss function refers to a function that impacts how a machine learning model is trained in a supervised learning model. For example, during each training iteration, the output of the machine learning model is compared to the known annotation information in the training data. The loss function provides a value (the "loss") for how close the predicted annotation data is to the actual annotation data. After computing the loss, the parameters of the model are updated accordingly and a new set of predictions are made during the next iteration.

Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). In some cases, a supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

At operation 1225, the system updates parameters of the diffusion model based on the comparison. In some cases, the operations of this step refer to, or may be performed by, a training component as described with reference to FIG. 5. In some cases, the training component updates the machine learning parameters of the diffusion model based on the loss function). For example, in some cases, the training component updates parameters of the U-Net using gradient descent. In some cases, the training component trains the U-Net to learn time-dependent parameters of the Gaussian transitions. In some cases, the training component optimizes for a negative log likelihood.

In some cases, the training component trains the second diffusion model independently of the first diffusion model. In some cases, the training component trains the first diffusion model to generate an output image at a first resolution. In some cases, the training component trains the second diffusion model to generate an output image at a second resolution that is higher than the first resolution.

FIG. 13 shows an example of a computing device 1300 according to aspects of the present disclosure. According to some aspects, computing device 1300 includes processor(s) 1305, memory subsystem 1310, communication interface 1315, I/O interface 1320, user interface component(s) 1325, and channel 1330.

In some embodiments, computing device 1300 is an example of, or includes aspects of, the image generation apparatus described with reference to FIGS. 1 and 5. In some embodiments, computing device 1300 includes one or more processors 1305 that can execute instructions stored in memory subsystem 1310 to obtain a prompt; generate, using a first diffusion model, a predicted denoised image at a first resolution based on the prompt, wherein the predicted denoised image is generated at a first intermediate diffusion step of the first diffusion model; upsample the predicted denoised image to obtain an upsampled denoised image at a second resolution that is higher than the first resolution; and generate, using a second diffusion model, an output image at the second resolution based on the prompt and the upsampled denoised image.

According to some aspects, computing device 1300 includes one or more processors 1305. Processor(s) 1305 are an example of, or includes aspects of, the processor unit as described with reference to FIG. 5. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof.

In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 1310 includes one or more memory devices. Memory subsystem 1310 is an example of, or includes aspects of, the memory unit as described with reference to FIG. 5. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1315 operates at a boundary between communicating entities (such as computing device 1300, one or more user devices, a cloud, and one or more databases) and channel 1330 and can record and process communications. In some cases, communication interface 1315 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1320 is controlled by an I/O controller to manage input and output signals for computing device 1300. In some cases, I/O interface 1320 manages peripherals not integrated into computing device 1300. In some cases, I/O interface 1320 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1320 or via hardware components controlled by the I/O controller.

According to some aspects, user interface component(s) 1325 enable a user to interact with computing device 1300. In some cases, user interface component(s) 1325 include an audio device, such as an external speaker system, an external display device such as a display screen, an input device (e.g., a remote control device interfaced with a user interface directly or through the I/O controller), or a combination thereof. In some cases, user interface component(s) 1325 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image generation, comprising:
obtaining a prompt;
generating, using a first diffusion model, a predicted denoised image at a first resolution based on the prompt, wherein the predicted denoised image is generated at a first intermediate diffusion step of the first diffusion model, and wherein the first intermediate diffusion step comprises a diffusion step between an initial diffusion step of the first diffusion model and a final diffusion step of the first diffusion model;
upsampling the predicted denoised image to obtain an upsampled denoised image at a second resolution that is higher than the first resolution; and
generating, using a second diffusion model, an output image having the second resolution based on the prompt and the upsampled denoised image.

2. The method of claim 1, wherein generating the output image further comprises:
performing a forward diffusion process on the upsampled denoised image to obtain an intermediate input image corresponding to a second intermediate diffusion step of the second diffusion model, wherein the output image is generated based on the intermediate input image.

3. The method of claim 2, further comprising:
adding noise to the upsampled denoised image, wherein the forward diffusion process is performed based on the added noise.

4. The method of claim 1, wherein:
the second diffusion model performs a reverse diffusion process beginning with a second intermediate diffusion step.

5. The method of claim 1, further comprising:
encoding the prompt to obtain a prompt embedding, wherein the first diffusion model and the second diffusion model use the prompt embedding as input.

6. The method of claim 1, wherein:
the first diffusion model uses a first sampler to generate the predicted denoised image and the second diffusion model uses a second sampler different than the first sampler to generate the output image.

7. The method of claim 6, wherein:
the second sampler comprises a stochastic differential equation (SDE) solver.

8. The method of claim 1, wherein:
the second diffusion model is trained independently of the first diffusion model.

9. A non-transitory computer readable medium storing instructions that, when executed by a processor, cause the processor to:

generate, using a first diffusion model, a predicted denoised image at a first resolution, wherein the predicted denoised image is generated at a first intermediate diffusion step of the first diffusion model, and wherein the first intermediate diffusion step comprises a diffusion step between an initial diffusion step of the first diffusion model and a final diffusion step of the first diffusion model;
upsample the predicted denoised image to obtain an upsampled denoised image at a second resolution that is higher than the first resolution;
perform a forward diffusion process on the upsampled denoised image to obtain an intermediate input image corresponding to a second intermediate diffusion step of a second diffusion model; and
generate, using the second diffusion model, an output image having the second resolution based on the intermediate input image.

10. The non-transitory computer readable medium of claim 9, wherein the instructions further cause the processor to:
add noise to the upsampled denoised image, wherein the forward diffusion process is performed based on the added noise.

11. The non-transitory computer readable medium of claim 9, wherein:
the second diffusion model performs a reverse diffusion process beginning with a second intermediate diffusion step.

12. The non-transitory computer readable medium of claim 9, wherein the instructions further cause the processor to:
encode a prompt to obtain a prompt embedding, wherein the first diffusion model and the second diffusion model use the prompt embedding as input.

13. The non-transitory computer readable medium of claim 9, wherein:
the first diffusion model uses a first sampler to generate the predicted denoised image and the second diffusion model uses a second sampler different than the first sampler to generate the output image.

14. The non-transitory computer readable medium of claim 13, wherein:
the second sampler comprises a stochastic differential equation (SDE) solver.

15. The non-transitory computer readable medium of claim 9, wherein:
the second diffusion model is trained independently of the first diffusion model.

16. A system for image generation, wherein the system comprises:
one or more processors;
one or more memory components coupled with the one or more processors;
a first diffusion model comprising first parameters stored in the one or more memory components, the first diffusion model trained to generate a predicted denoised image at a first resolution, wherein the predicted denoised image is generated at a first intermediate diffusion step of the first diffusion model, and wherein the first intermediate diffusion step comprises a diffusion step between an initial diffusion step of the first diffusion model and a final diffusion step of the first diffusion model;
an upsampling component configured to upsample the predicted denoised image to obtain an upsampled denoised image at a second resolution that is higher than the first resolution; and a second diffusion model comprising second parameters stored in the one or more memory components, the second diffusion model trained to generate an output image having the second resolution based on the upsampled denoised image.

17. The system of claim 16, further comprising:

a forward diffusion component configured to perform a forward diffusion process on the upsampled denoised image to obtain an intermediate input image corresponding to a second intermediate diffusion step of the second diffusion model, wherein the output image is generated based on the intermediate input image.

18. The system of claim 16, wherein:

the second diffusion model is further trained to perform a reverse diffusion process beginning with a second intermediate diffusion step.

19. The system of claim 16, further comprising:

a training component configured to train the first diffusion model and the second diffusion model.

20. The system of claim 19, wherein:

the training component is further configured to train the second diffusion model independently of the first diffusion model.

* * * * *